(12) United States Patent
Nagai et al.

(10) Patent No.: US 6,650,090 B2
(45) Date of Patent: Nov. 18, 2003

(54) BATTERY PACK AND SIGNAL TRANSMISSION SYSTEM

(75) Inventors: Tamiji Nagai, Kanagawa (JP); Tamon Ikeda, Tokyo (JP); Kazuo Yamazaki, Kanagawa (JP); Makoto Kamoshida, Tokyo (JP); Tadahisa Yamamoto, Kanagawa (JP); Kuniharu Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 40 days.

(21) Appl. No.: 09/844,360

(22) Filed: Apr. 27, 2001

(65) Prior Publication Data

US 2002/0005709 A1 Jan. 17, 2002

(30) Foreign Application Priority Data

Apr. 28, 2000 (JP) ........................................ 2000-129214
May 29, 2000 (JP) ........................................ 2000-158232

(51) Int. Cl.[7] ................................................. H02J 7/04
(52) U.S. Cl. ....................................... 320/150; 320/137
(58) Field of Search ................................ 320/150, 137, 320/132, 134, 136; 324/426, 427

(56) References Cited

U.S. PATENT DOCUMENTS 6,118,255 A * 9/2000 Nagai et al. ................. 320/152
6,133,711 A * 10/2000 Hayashi et al. .............. 320/128

* cited by examiner

*Primary Examiner*—Lawrence Luk
(74) *Attorney, Agent, or Firm*—Frommer Lawrence & Haug LLP; William S. Frommer; Dennis M. Smid

(57) ABSTRACT

A battery pack BP having terminals T1, T2, and T3, a detecting circuit, a signal generating circuit, a temperature, voltage, and current detecting circuit, a switching circuit, and a secondary battery connected to the switching circuit. A first external signal generating unit may be connected to terminals T1 and T2 and a second external signal generating unit may be connected to terminals T2 and T3. The detecting circuit detects whether the first or second external signal generating units has been connected. In so doing, the detecting circuit may detect an impedance of the first external signal generating unit and may detect a terminal voltage of the second external signal generating unit. The on/off operations of the switching circuit SW may be controlled in accordance with the detection result.

5 Claims, 24 Drawing Sheets

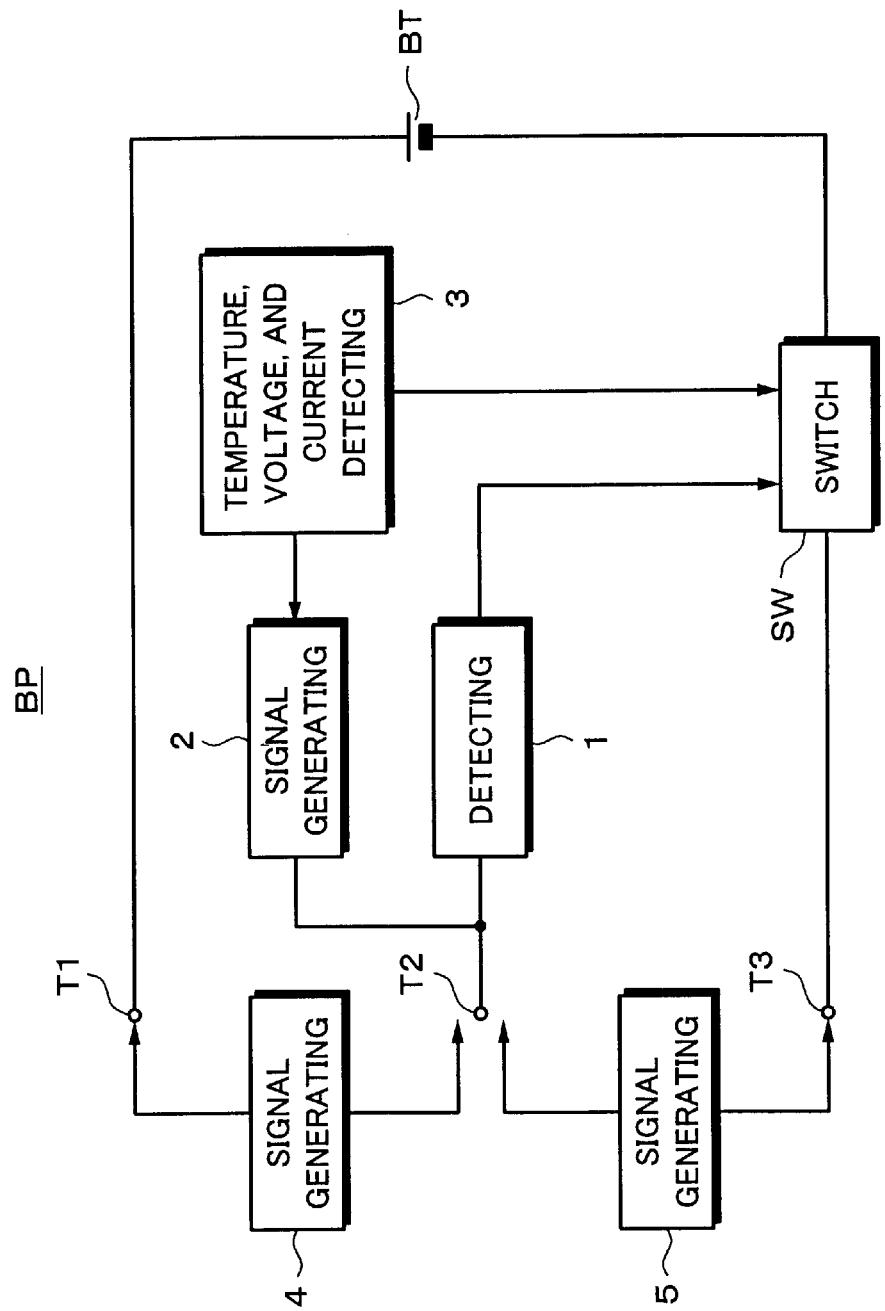

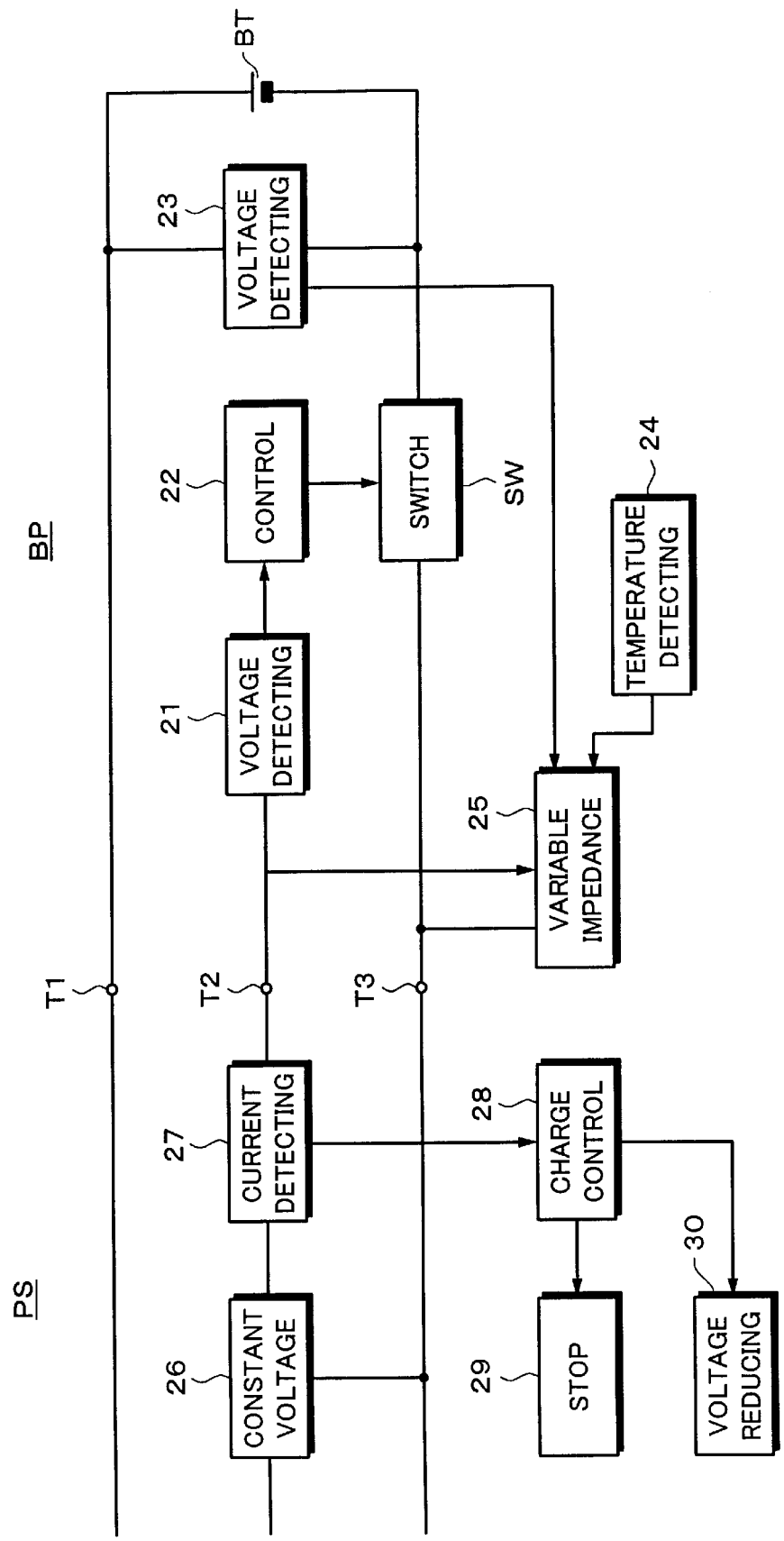

BATTERY PACK AND SIGNAL TRANSMISSION SYSTEM

BACKGROUND OF THE INVENTION

1. Field of the Invention

The invention relates to a signal transmission system which is suitable when it is used for charging and discharging a battery pack and to a battery pack.

2. Description of the Related Arts

In recent years, a chargeable battery pack has been used in a cellular phone and a VTR integrated type digital camera (hereinafter, they are generally referred to as electronic apparatuses). The battery pack is constructed by a secondary battery and used in a state where it is built in the electronic apparatus or in a removable state. In a state where the battery pack is attached to the electronic apparatus, the battery pack can be charged. In addition to the secondary battery, a protecting circuit is provided for the battery pack. A circuit for detecting a voltage, a current, and a temperature of the secondary battery and the like are provided for the protecting circuit.

There is a case where, for example, when a chain short-circuit occurs, the secondary battery overheats and a heat generation of the secondary battery occurs. In the worst case, there is a case where a fire occurs due to the chain short-circuit as a cause. Therefore, to prevent the overheat of the secondary battery, the protecting circuit for detecting the voltage, current, and temperature is provided for the battery pack.

For example, as shown in FIG. 1, the battery pack is constructed by terminals T1, T2, and T3, a detecting circuit 71, a detecting and control circuit 72, a switching circuit SW, and a secondary battery BT. The detecting circuit 71 detects impedances of an electronic apparatus and a charging device to which the battery pack is connected. The detecting and control circuit 72 detects a terminal voltage, a current, and a temperature of the secondary battery BT. The on/off operations of the switching circuit SW are controlled in accordance with the detected terminal voltage, current, and temperature. For example, when an overcharge is detected, the switching circuit SW is turned off.

In recent years, as shown in FIG. 2, there is a method of detecting an impedance connected to the battery pack and controlling the protecting circuit. In FIG. 2, the battery pack BP is constructed by terminals T11, T12, and T13, a signal receiving and transmitting circuit 211, a detection control circuit 212, the switching circuit SW, and the secondary battery BT. An impedance 213 is connected through the terminals T11 and T12. An impedance 214 is connected through the terminals T12 and T13. When the impedance 213 or 214 is connected, a signal which is obtained from the connected impedance 213 or 214 is received by the signal receiving and transmitting circuit 211. The received signal is supplied from the signal receiving and transmitting circuit 211 to the detection control circuit 212. The detection control circuit 212 detects a temperature and a terminal voltage and/or a current of the secondary battery BT. The detection control circuit 212 controls the switching circuit SW in accordance with the detected temperature, terminal voltage, and/or current of the secondary battery BT and with the supplied signal.

According to the protecting circuit of a type such that the impedance connected to the battery pack is detected and the switching circuit is controlled as mentioned above, there is a problem such that a residual voltage, a residual current, and a temperature of the secondary battery BT cannot be communicated (transmitted) with (to) an external electronic apparatus or charging device.

According to the method of detecting the impedance and controlling the protecting circuit as mentioned above, there is also a problem such that the signal can be transmitted only upon charging or upon discharging. Further, there is a problem such that a use range is narrow.

Assuming that the signal to be transmitted is a digital signal, there is a problem such that the circuit is expensive. Hitherto, since a power source at the time when the signal is transmitted from the battery pack to the outside is obtained from the secondary battery included in the battery pack, there is also a problem such that when a voltage of the secondary battery drops, the digital signal cannot be outputted and the electronic apparatus cannot be controlled.

On the other hand, in order to output the signal even if the voltage of the secondary battery drops, since terminals for supplying the power source are necessary, there is also a problem such that at least four terminals are necessary.

OBJECTS AND SUMMARY OF THE INVENTION

It is, therefore, an object of the invention to provide a battery pack which can communicate with an external electronic apparatus or charging device.

Another object of the invention is to provide a signal transmission system and a battery pack, in which a power source is supplied from an outside through three terminals and a signal can be transmitted to the outside even upon charging and discharging.

According to the first aspect of the invention, there is provided a battery pack using a secondary battery, comprising: at least first, second, and third terminals; signal transmitting means for transmitting a signal from one of the first, second, and third terminals; first detecting means for detecting a first device connected to the first and second terminals and a second device connected to the second and third terminals; second detecting means for detecting a temperature, a voltage, and/or a current of the secondary battery; and control means for turning on switching means when the first or second device is detected by the first detecting means and turning off the switching means when the first or second device is not detected by the first detecting means.

When one of the first device (electronic apparatus) and the second device (charging device) is connected and it is detected that the first or second device has been connected, the switching means is turned on. When it is detected that the first or second device is disconnected, the switching means is turned off. The signal is transmitted from at least one of the first, second, and third terminals.

According to the sixth aspect of the invention, there is provided a signal transmission system for transmitting a signal from a battery pack to an outside, wherein the battery pack comprises: first, second, and third terminals; a secondary battery and switching means which are serially connected between the first and second terminals; power forming means for forming a predetermined power source from a power source which is supplied through the first or second terminal and the third terminal; signal transmitting means for transmitting a signal which is formed by the power source which is supplied from the power forming means through the first or second terminal and the third terminal; and control means for controlling the switching means, and a charging device obtains the power source which is supplied to the battery pack through the first or second terminal and the third terminal from a commercially available power source.

According to the tenth aspect of the invention, there is provided a battery pack comprising: first, second, and third terminals; a secondary battery and switching means which are serially connected between the first and second terminals; power forming means for forming a predetermined power source from a power source which is supplied through the first or second terminal and the third terminal; signal transmitting means for forming a signal by the power source which is supplied from the power forming means and transmitting the formed signal through the first or second terminal and the third terminal; and control means for controlling the switching means.

As mentioned above, the charging device and the battery pack are connected through the three terminals, the power source which is formed from the commercially available power source by the charging device, and the signal can be transmitted to the outside by the supplied power source.

The above and other objects and features of the present invention will become apparent from the following detailed description and the appended claims with reference to the accompanying drawings.

BRIEF DESCRIPTION OF THE DRAWINGS

FIG. 3 is a block diagram of the first embodiment to which the invention is applied;

FIG. 5 is a block diagram for use in explanation upon charging to which the invention is applied;

DETAILED DESCRIPTION OF THE PREFERRED EMBODIMENTS

Figure 1:
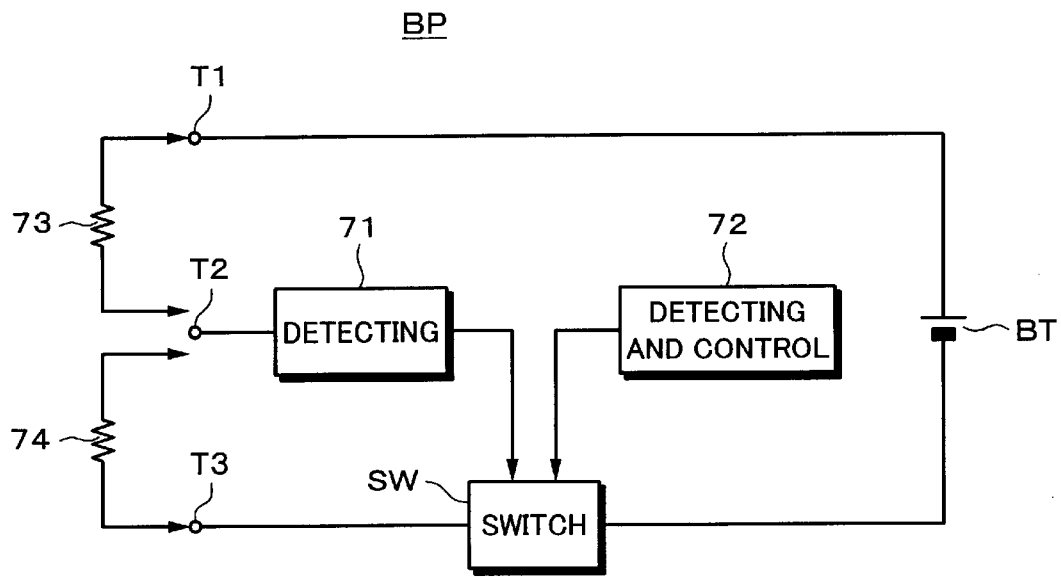
FIG. 1 is a block diagram for explaining a conventional protecting circuit.
Figure 2:
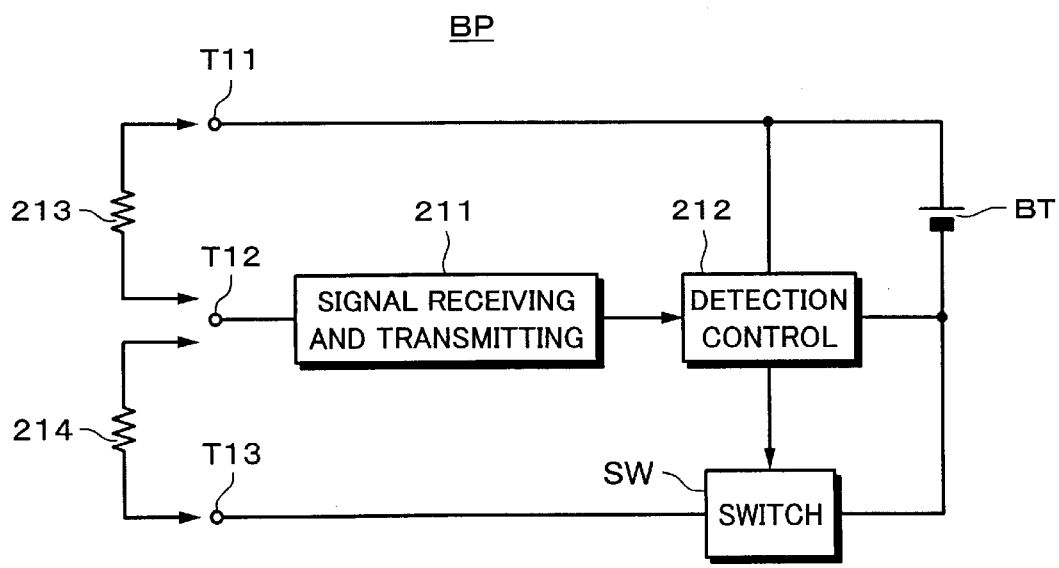
FIG. 2 is a block diagram for explaining a conventional battery pack.

Embodiments of the invention will be described hereinbelow with reference to the drawings. The component elements having substantially the same effects in the diagrams are designated by the same reference numerals and their overlapped explanation is avoided. FIG. 3 shows the first embodiment to which the invention is applied. A battery pack BP is constructed by: the terminals T1, T2, and T3; a detecting circuit 1; a signal generating circuit 2; a temperature, voltage, and current detecting circuit 3; the switching circuit SW; and the secondary battery BT. An external signal generating unit 4 is connected to the terminals T1 and T2. An external signal generating unit 5 is connected to the terminals T2 and T3.

The detecting circuit 1 detects that the external signal generating unit 4 or 5 has been connected. In accordance with a detection result, the on/off operations of the switching circuit SW are controlled. The temperature, voltage, and current detecting circuit 3 detects a temperature of the battery pack BP and a terminal voltage and a current of the secondary battery BT. The on/off operations of the switching circuit SW are controlled on the basis of the detected temperature, voltage, and current. A signal is supplied to the signal generating circuit 2 on the basis of the detected temperature, voltage, and current. The signal generating circuit 2 supplies the signal to an electronic apparatus or a charging device connected through the terminal T2 on the basis of the supplied signal.

An example of controlling the switching circuit SW will now be described. First, a control of the switching circuit SW upon discharging will be described with reference to FIG. 4A. Upon discharging of the secondary battery BP, in an impedance detecting circuit 11, it is detected that an impedance 13 has been connected between the terminals T1 and T2. A value of the impedance 13 detected by the impedance detecting circuit 11 is supplied to a control circuit 12. The control circuit 12 discriminates whether the supplied value of the impedance 13 is smaller than 1 kΩ or not. If it is determined that the value of the impedance 13 is equal to 1 kΩ, a control signal is supplied to the switching circuit SW so as to turn on the switching circuit SW. If it is determined that the value of the impedance 13 is smaller than 1 kΩ, a control signal is supplied to the switching circuit SW so as to turn off the switching circuit SW. The purpose of turning off the switching circuit SW when the value of the impedance 13 is smaller than 1 kΩ is to prevent a chain short-circuit.

The control of the switching circuit SW upon charging will now be described with reference to FIG. 4B. When the secondary battery BP is charged, in a voltage detecting circuit 16, it is detected that a power source 18 has been connected between the terminals T2 and T3. A voltage of the power source 18 detected by the voltage detecting circuit 16 is supplied to a control circuit 17. The control circuit 17 discriminates the supplied voltage of the power source 18. If it is decided that the voltage of the power source 18 is equal to 2V, a control signal is supplied to the switching circuit SW so as to turn on the switching circuit SW. If it is determined that the voltage of the power source 18 is equal to 3V, a control signal is supplied to the switching circuit SW so as to turn off the switching circuit SW. The power source 18 is, for example, a voltage or a current which is formed from the power source that is derived from a charging device. Although not shown in FIG. 4B, the control circuit 17 and a minus (−) side of the secondary battery BT can be also connected.

Figure 4A:
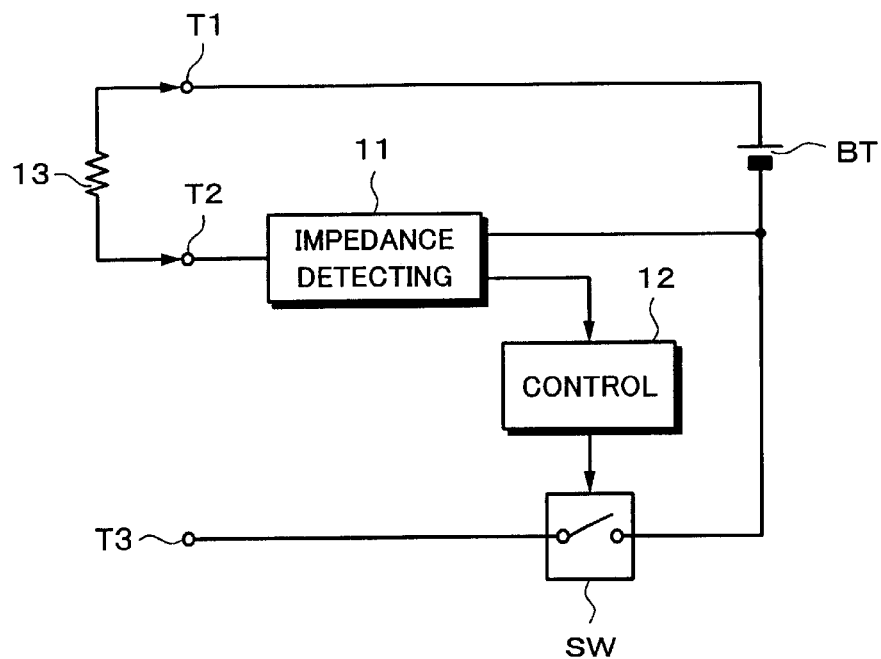
FIGS. 4A and 4B are block diagrams of examples for use in explanation of the invention.
Figure 4B:
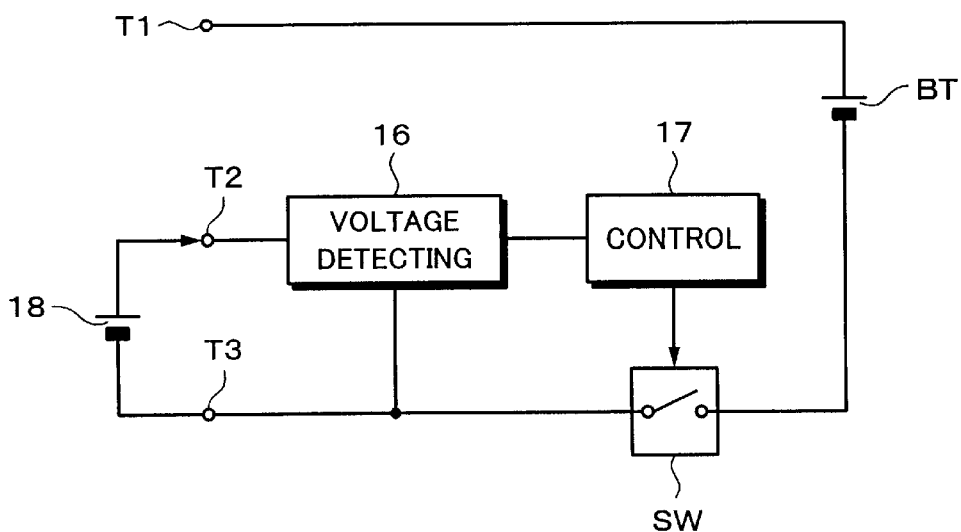

According to FIGS. 4A and 4B, when the secondary battery BP is discharged (FIG. 4A), the switching circuit SW is controlled by using the control circuit 12 and when it is charged (FIG. 4B), the switching circuit SW is controlled by using the control circuit 17. However, the switching circuit SW can be also controlled by using the same control circuit.

Generally, in case of handling the secondary battery, safety upon charging which is higher than that upon discharging is necessary. This is because when the secondary battery is charged, if the battery enters what is called an overcharging state where a voltage and/or a current exceeding a proper value of the secondary battery is supplied, there is a possibility that the secondary battery overheats and a fire occurs. An embodiment in which the signal is transmitted from the battery pack BP to the charging device upon charging in order to prevent the overcharging, therefore, will now be described with reference to FIG. 5.

In the embodiment shown in FIG. 5, the battery pack BP comprises: voltage detecting circuits 21 and 23; a control circuit 22; a temperature detecting circuit 24; a variable impedance circuit 25; the switching circuit SW; and the secondary battery BT. As a part of a charging device PS connected to the battery pack BP, FIG. 5 shows a constant voltage circuit 26, a current detecting circuit 27, a charge control circuit 28, a stop circuit 29, and a voltage reducing circuit 30.

Figure 6:
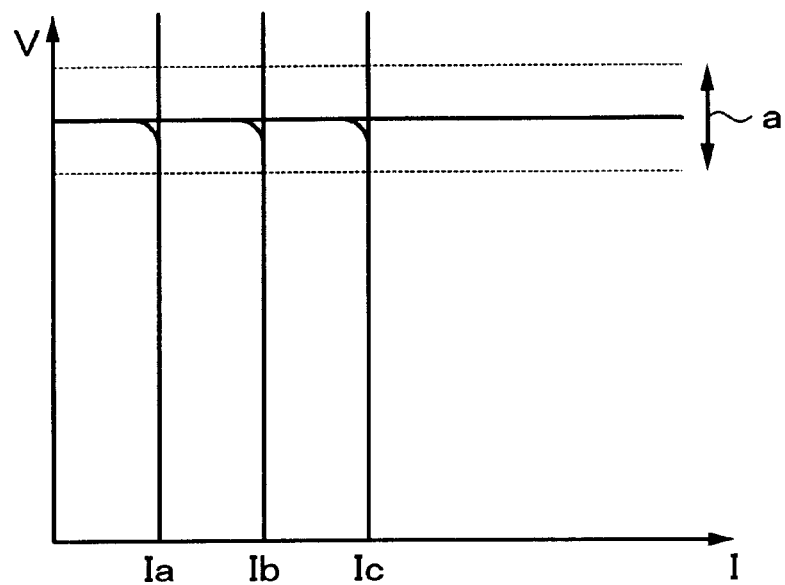
FIG. 6 is a characteristics diagram for explaining a voltage which is applied to the invention.

In the constant voltage circuit 26, a predetermined voltage which lies within a range (a) shown in FIG. 6 is formed from the power source which is obtained from the charging device PS. The formed predetermined voltage is supplied to the battery pack BP through the current detecting circuit 27 and terminal T2.

The voltage supplied through the terminal T2 as mentioned above is supplied to the voltage detecting circuit 21 and variable impedance circuit 25. The voltage detecting circuit 21 detects the voltage supplied from the charging device PS. The detected voltage is supplied to the control circuit 22. In the control circuit 22, if it is determined that the supplied voltage is equal to 2V as mentioned above, a control signal is supplied to the switching circuit SW so as to turn on the switching circuit SW. If it is decided that the supplied voltage is equal to 3V as mentioned above, a control signal is supplied to the switching circuit SW so as to turn off the switching circuit SW. As mentioned above, the switching circuit SW is controlled by the control signal from the control circuit 22.

In the voltage detecting circuit 23, a terminal voltage of the secondary battery BT is detected. If the terminal voltage of the secondary battery BT exceeding the predetermined range is detected in the voltage detecting circuit 23, a signal is supplied to the variable impedance circuit 25. The temperature detecting circuit 24 detects a temperature of the battery pack BP. When the temperature of about 0° C. or about 50° C. is detected in the temperature detecting circuit 24, a signal is supplied to the variable impedance circuit 25. In the variable impedance circuit 25, an impedance is varied on the basis of the signal from the voltage detecting circuit 23 and/or the signal from the temperature detecting circuit 24.

Figure 7:
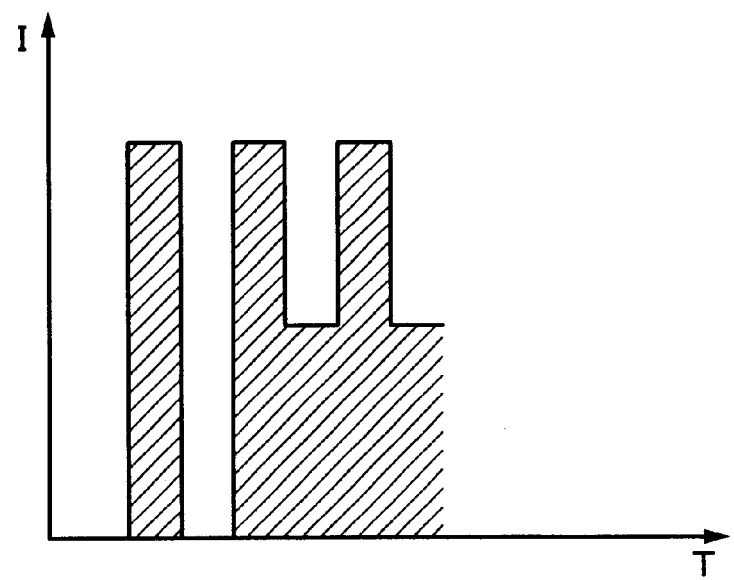
FIG. 7 is a schematic diagram for explaining a digital signal which is applied to the invention.

When the impedance is varied in the variable impedance circuit 25, as shown in FIG. 6, since a value of one of currents Ia, Ib, and Ic is set, the varied current is detected by the current detecting circuit 27. For example, when the current Ia shown in FIG. 6 is detected by the current detecting circuit 27, a signal showing that the current Ia has been detected is supplied from the current detecting circuit 27 to the charge control circuit 28. In the embodiment, a digital signal which is formed by a current shown in FIG. 7 is transmitted from the battery pack BP to the charging device PS as an example.

The charge control circuit 28 discriminates whether the charging is stopped or the output voltage is reduced in accordance with the supplied current. If it is determined in the charge control circuit 28 that the charging is stopped, a signal is supplied to the stop circuit 29. The stop circuit 29 stops the output of the voltage and current from the charging device PS. If it is determined in the charge control circuit 28 that the output voltage is reduced, a signal is supplied to the voltage reducing circuit 30. The voltage reducing circuit 30 reduces the voltage outputted from the charging device PS to a predetermined value.

A priority is set into the signal which is outputted from the battery pack BP upon discharging and charging. As shown in FIG. 4A mentioned above, upon discharging, since the electronic apparatus does not have a power source, an impedance is connected to the terminals T1 and T2 and a value of the impedance is detected. Upon charging, as shown in FIGS. 4B and 5, the impedance is varied on the battery pack BP side and the signal can be transmitted to the charging device PS. Further, since the safety upon charging higher than that upon discharging is necessary as mentioned above, in the embodiment, the high priority is set into the signal which is outputted when the battery pack BP is charged.

If the charging is started when the discharging is performed with the charging device PS connected, therefore, the signal that is outputted upon charging is outputted from the battery pack BP to the charging device PS. In case of charging the battery pack BP, the charging device PS can obtain the power source from the charging device PS and output various signals to the battery pack BP. On the other hand, the signal which is outputted from the battery pack BP to the charging device PS is either a constant voltage signal or a constant current signal. In case of the digital signal, since it is unidirectional, it is difficult to transmit the signal at every predetermined time.

Figure 8:
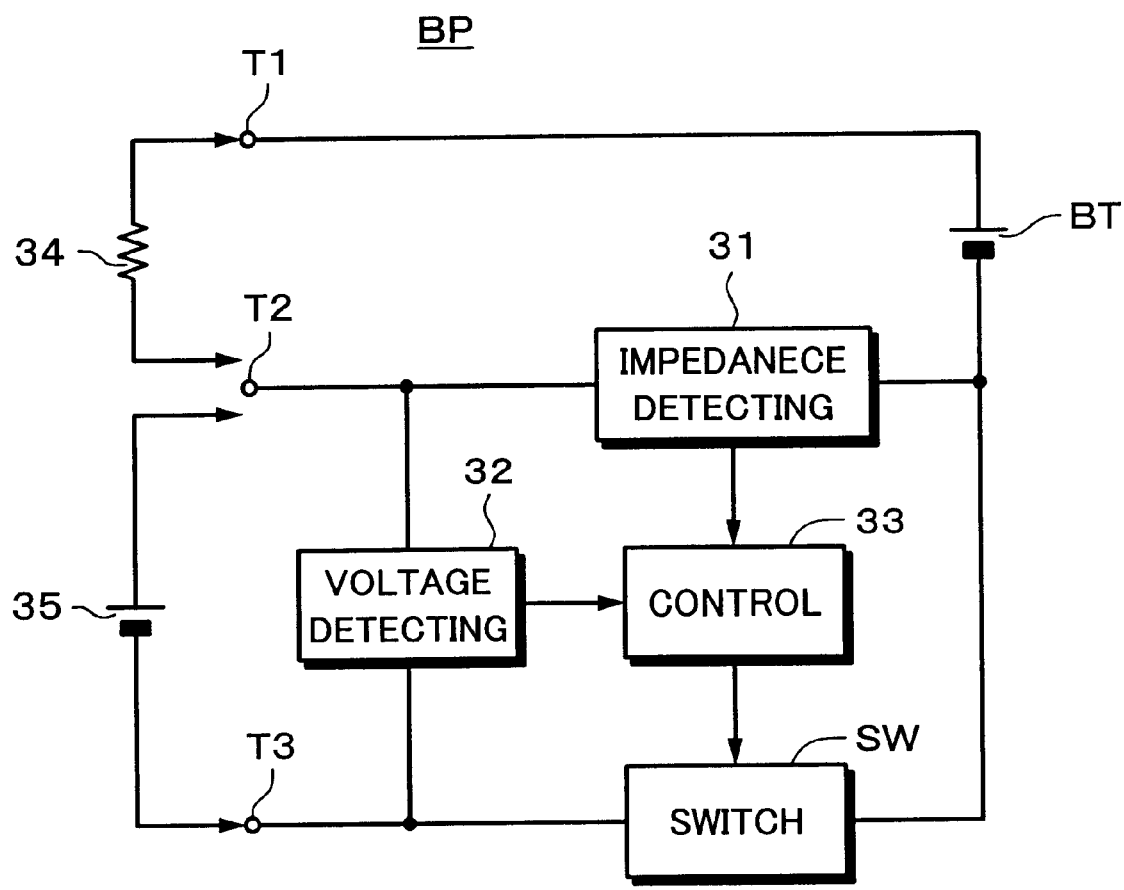
FIG. 8 is a block diagram of the second embodiment to which the invention is applied.

FIG. 8 shows a block diagram of the second embodiment of the invention. When the battery pack BP is connected to the electronic apparatus, an impedance 34 is connected to the terminals T1 and T2. When the impedance is connected to the terminals T1 and T2, an impedance detecting circuit 31 detects a value of the impedance. The detected value of the impedance 34 is supplied from the impedance detecting circuit 31 to a control circuit 33. The control circuit 33 discriminates whether the supplied value of the impedance 34 is smaller than 1 kΩ or not. If it is determined that the value of the impedance 34 is equal to 1 kΩ, a control signal is supplied to the switching circuit SW so as to turn on the switching circuit SW. If it is determined that the value of the impedance 34 is smaller than 1 kΩ, a control signal is supplied to the switching circuit SW so as to turn off the switching circuit SW.

When the battery pack BP is connected to the charging device, a power source 35 is connected to the terminals T2 and T3. When the power source 35 is connected to the terminals T2 and T3, a voltage detecting circuit 32 detects a voltage which is outputted from the power source 35. The detected voltage is supplied from the voltage detecting circuit 32 to the control circuit 33. The control circuit 33 discriminates the supplied voltage of the power source 35. If it is determined that the voltage of the power source 35 is equal to 2V, a control signal is supplied to the switching circuit SW so as to turn on the switching circuit SW. If it is determined that the voltage of the power source 35 is equal to 3V, a control signal is supplied to the switching circuit SW so as to turn off the switching circuit SW.

Therefore, by reducing the value of the impedance 34 and a change range of the voltage or current which is outputted from the power source 35, even if the chain short-circuit occurs, the switching circuit SW is not turned on, so that the battery pack can be safely used.

The operation will now be described with reference to a flowchart shown in FIG. 9. In step S1, whether the battery pack BP has been connected to the electronic apparatus or connected to the charging device PS is discriminated. If it is determined that the battery pack has been connected to the electronic apparatus, a control advances to step S2. If it is determined that the battery pack has been connected to the charging device PS, the control advances to step S4. In step S2, the value of the impedance 34 connected to the terminals T1 and T2 is detected by the impedance detecting circuit 31. In step S3, the control circuit 33 discriminates whether the detected value of the impedance 34 is equal to a reference value or not. If it is determined that it is equal to the reference value, the control advances to step S6. If it is determined that it is not equal to the reference value, the control is returned to step S2.

In step S4, a voltage which is outputted from the power source 35 connected to the terminals T2 and T3 is detected by the voltage detecting circuit 32. In step S5, the control circuit 33 discriminates whether the detected voltage is equal to a reference voltage or not. If it is determined that it is equal to the reference voltage, the control advances to step S6. If it is determined that it is not equal to the reference voltage, the control is returned to step S4.

In step S6, the switching circuit SW is turned on. In step S7, the value of the impedance and/or the voltage is detected by the impedance detecting circuit 31 and/or the voltage detecting circuit 32. In step S8, whether at least a signal has been supplied from the impedance detecting circuit 31 and/or the voltage detecting circuit 32 to the control circuit 33 or not is discriminated. If it is determined that there is no signal, the control advances to step S9. If it is determined that there is the signal, the control is returned to step S7. In step S9, a delay of a time constant Δt is performed. In step S10, the switching circuit SW is turned off.

Figure 9:
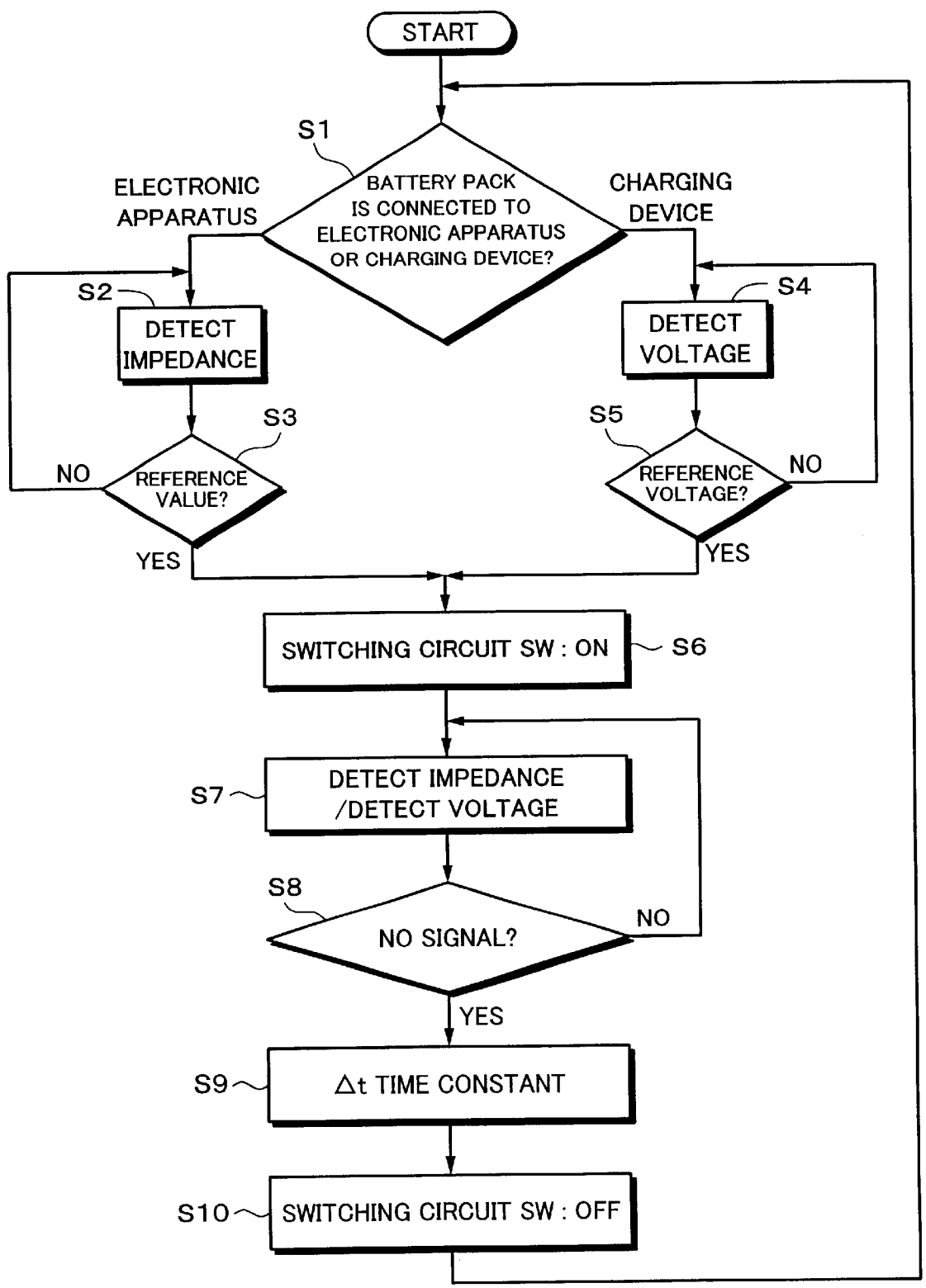
FIG. 9 is a flowchart for explaining the operation in the second embodiment to which the invention is applied.

In the flowchart of FIG. 9, the delay of the time constant Δt is performed in step S9. However, step S9 can be also omitted.

Figure 10:
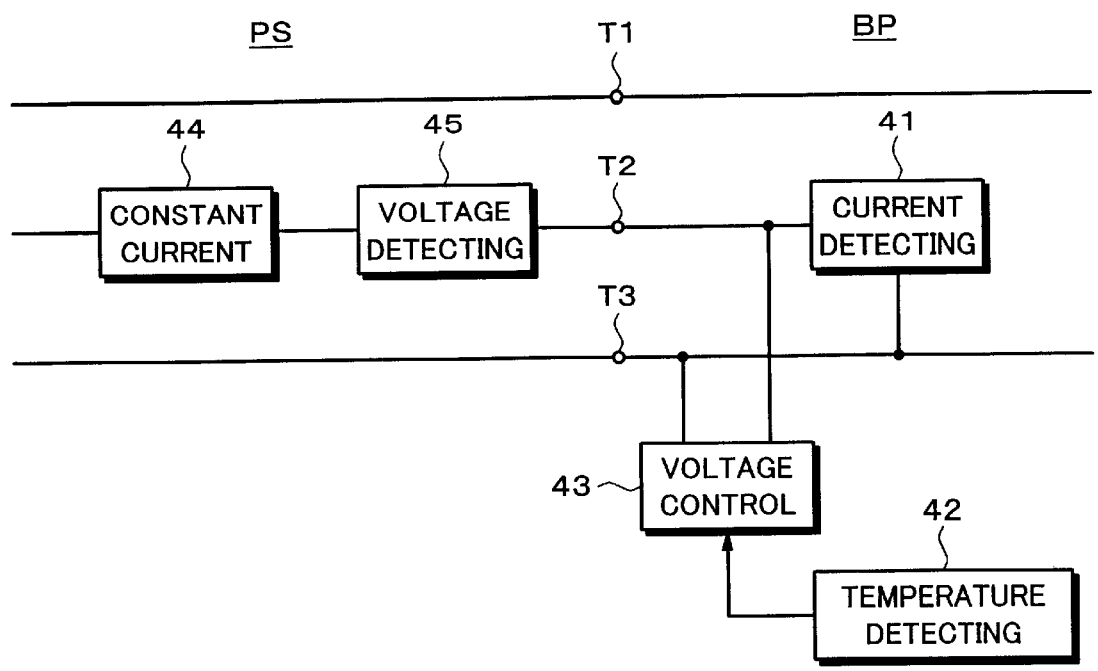
FIG. 10 is a block diagram of the third embodiment to which the invention is applied.

FIG. 10 shows the third embodiment of the invention. In the third embodiment, a voltage is used as a signal which is transmitted from the battery pack BP to the charging device PS. In the third embodiment, a current detecting circuit 41, a voltage control circuit 43, and a temperature detecting circuit 42 are shown as a part of the battery pack BP. A constant current circuit 44 and a voltage detecting circuit 45 are shown as a part of the charging device PS connected to the battery pack BP.

The constant current circuit 44 forms a predetermined current from the power source which is obtained from the charging device PS. The formed predetermined current is supplied to the battery pack BP through the voltage detecting circuit 45 and terminal T2.

The current supplied through the terminal T2 is supplied to the current detecting circuit 41 and voltage control circuit 43. The current supplied from the charging device PS is detected by the current detecting circuit 41. The detected current is supplied to a control circuit (not shown). The switching circuit SW is controlled on the basis of the current supplied to the control circuit.

The temperature detecting circuit 42 detects the temperature of the battery pack BP. If the temperature of about 0° C. or about 50° C. is detected in the temperature detecting circuit 42, the signal is supplied to the voltage control circuit 43. The voltage control circuit 43 varies the voltage on the basis of the signal from the temperature detecting circuit 42.

Figure 11:
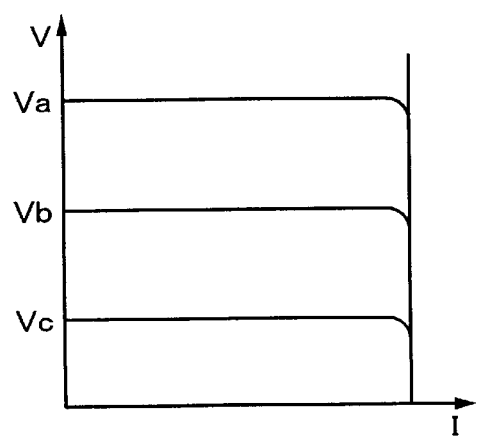
FIG. 11 is a characteristics diagram for explaining a current which is applied to the invention.
Figure 12:
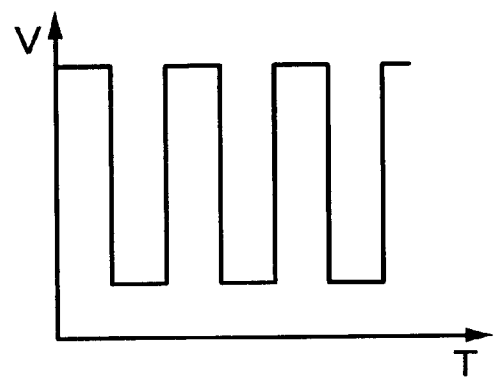
FIG. 12 is a schematic diagram for explaining a digital signal which is applied to the invention.

Since the voltage which is transmitted through the terminal T2 is set to the value of one of voltages Va, Vb, and Vc by the voltage control circuit 43 as shown in FIG. 11, the voltage is detected by the voltage detecting circuit 45 of the charging device PS. That is, the digital signal which is formed by a voltage shown in FIG. 12 is transmitted from the battery pack BP to the charging device PS.

Figure 13:
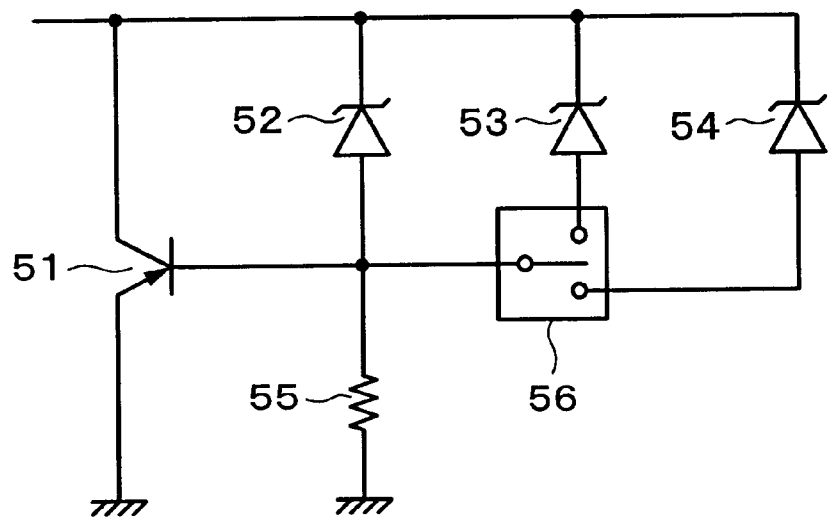
FIG. 13 is a block diagram of an example of a voltage control circuit which is applied to the invention.

An example of the voltage control circuit 43 will now be described with reference to FIG. 13. A collector of an npn-type transistor 51 is connected to the terminal T2, a base is connected to the ground through a resistor 55, and an emitter is connected to the ground. A cathode of a Zener diode 52, a cathode of a Zener diode 53, and a cathode of a Zener diode 54 are connected to the terminal T2. An anode of the Zener diode 52 is connected to the base of the transistor 51. An anode of the Zener diode 53 and an anode of the Zener diode 54 are connected to the base of the transistor 51 through a switching circuit 56.

For example, a Zener voltage of the Zener diode 52 is assumed to be the voltage Va shown in FIG. 11, a Zener voltage of the Zener diode 53 is assumed to be the voltage Vb shown in FIG. 11, and a Zener voltage of the Zener diode 54 is assumed to be the voltage Vc shown in FIG. 11, respectively. Therefore, when the switching circuit 56 selects the Zener diode 54, the voltage Vc is transmitted from the battery pack BP to the charging device PS. When the switching circuit 56 selects the Zener diode 53, the voltage Vb is transmitted from the battery pack BP to the charging device PS. When the switching circuit 56 selects none of the Zener diodes 53 and 54, the voltage Va is transmitted from the battery pack BP to the charging device PS.

Figure 14:
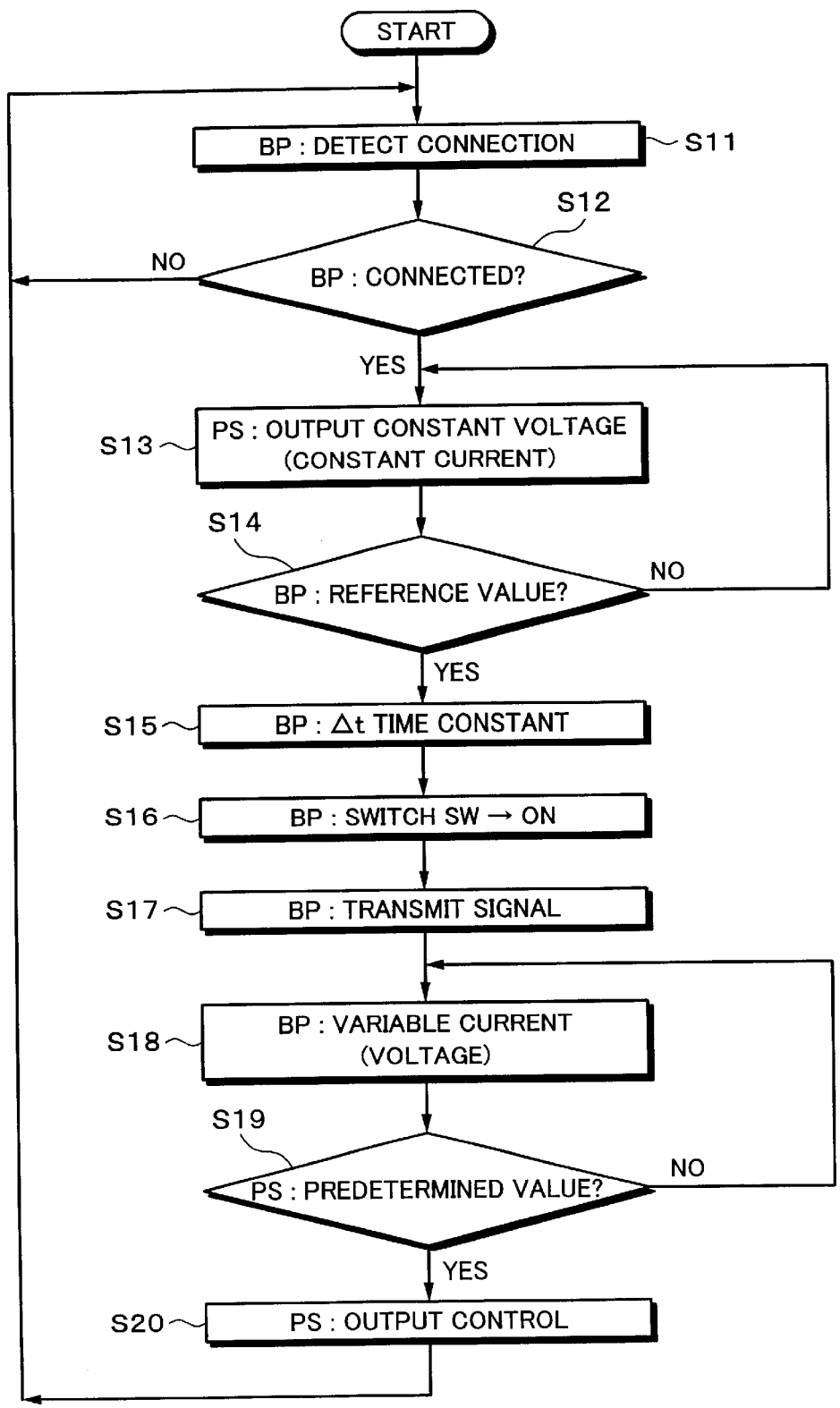
FIG. 14 is a flowchart for explaining the operation in the third embodiment to which the invention is applied.

FIG. 14 shows a flowchart for explaining the operation in the embodiment. In step S11, whether the battery pack BP has been connected to the charging device PS or not is discriminated on the battery pack BP side. In step S12, whether the battery pack BP has been connected to the charging device PS or not is discriminated on the battery pack BP side. If it is determined that the battery pack has been connected, a control advances to step S13. If it is determined that the battery pack is not connected, the control is returned to step S11. In step S13, a constant voltage is outputted from the charging device PS to the battery pack BP. In step S14, whether the supplied voltage is equal to a reference value or not is discriminated on the battery pack BP side. If it is determined that it is equal to the reference value, the control advances to step S15. If it is determined that it is not equal to the reference value, the control is returned to step S13.

In step S15, a delay of the time constant Δt is performed on the battery pack BP side. In step S16, on the battery pack BP side, the switching circuit SW is turned on. In step S17, the signal is transmitted from the battery pack BP to the charging device PS. In step S18, for example, on the battery pack BP side, if the temperature of the battery pack BP exceeds a proper range, the value of the current is varied. In step S19, the current transmitted from the battery pack BP is detected on the charging device PS side and whether the detected current is equal to a predetermined value or not is discriminated. If it is determined that it is equal to the predetermined value, the control advances to step S20. If it is determined that it is not equal to the predetermined value, the control is returned to step S18. In step S20, on the charging device PS side, the voltage and current which are outputted from the charging device PS are controlled on the basis of the signal which is transmitted from the battery pack BP. The control advances to step S11.

In the flowchart of FIG. 14, the constant voltage is outputted from the charging device PS to the battery pack BP, and the digital signal which is formed by the current is transmitted from the battery pack BP to the charging device PS. However, it is also possible to construct the apparatus in a manner such that a constant current is outputted from the charging device PS to the battery pack BP and the digital signal which is formed by the voltage is transmitted from the battery pack BP to the charging device PS. In this case, in step S13, the constant current is outputted from the charging device PS. In step S14, whether the supplied current is equal to a reference value or not is discriminated. Further, in step S18, the voltage is varied. In step S19, whether the varied voltage is equal to a predetermined value or not is discriminated.

Figure 15:
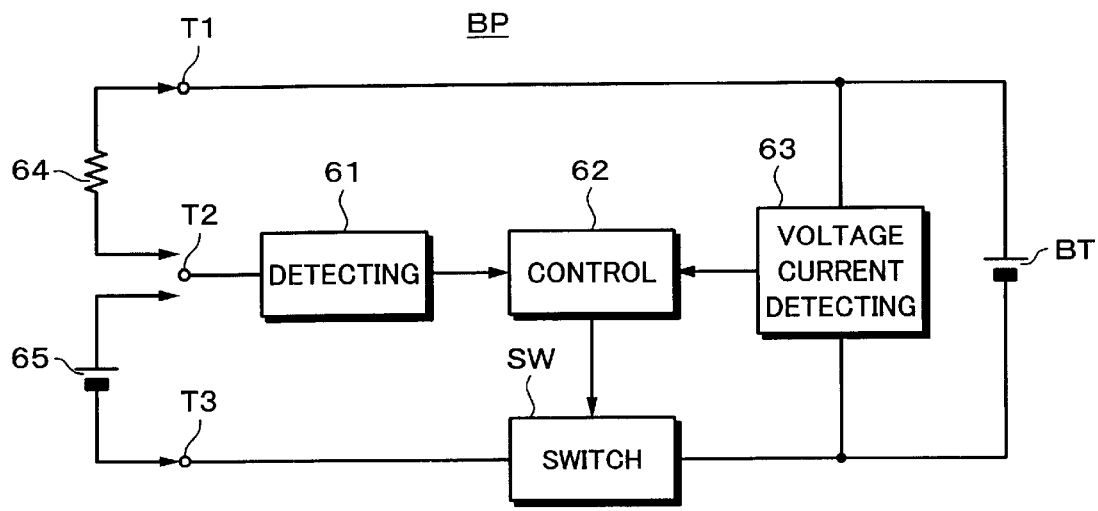
FIG. 15 is a block diagram of the fourth embodiment to which the invention is applied.

FIG. 15 shows the fourth embodiment of the invention. In a detecting circuit 61, an impedance 64 connected to the terminals T1 and T2 or a power source 65 connected to the terminals T2 and T3 can be detected. A value of the detected impedance 64 or a voltage and a current of the power source 65 are supplied to a control circuit 62. A voltage current detecting circuit 63 detects the terminal voltage and current of the secondary battery BT. The detected terminal voltage and current are supplied from the voltage current detecting circuit 63 to the control circuit 62. In the control circuit 62, a control signal to turn on/off the switching circuit SW in accordance with a signal from the detecting circuit 61 and a signal from the voltage current detecting circuit 63 is supplied to the switching circuit SW. The on/off operations of the switching circuit SW are controlled by the control signal from the control circuit 62.

As mentioned above, according to the fourth embodiment, the detecting circuit 61 for detecting the impedance 64 connected to the terminals T1 and T2 and the power source 65 connected to the terminals T2 and T3 is provided.

Although the secondary battery BT is shown as one battery in the diagram in the embodiment, a system in which secondary batteries are combined in parallel and/or in series can be also used.

Figure 16:
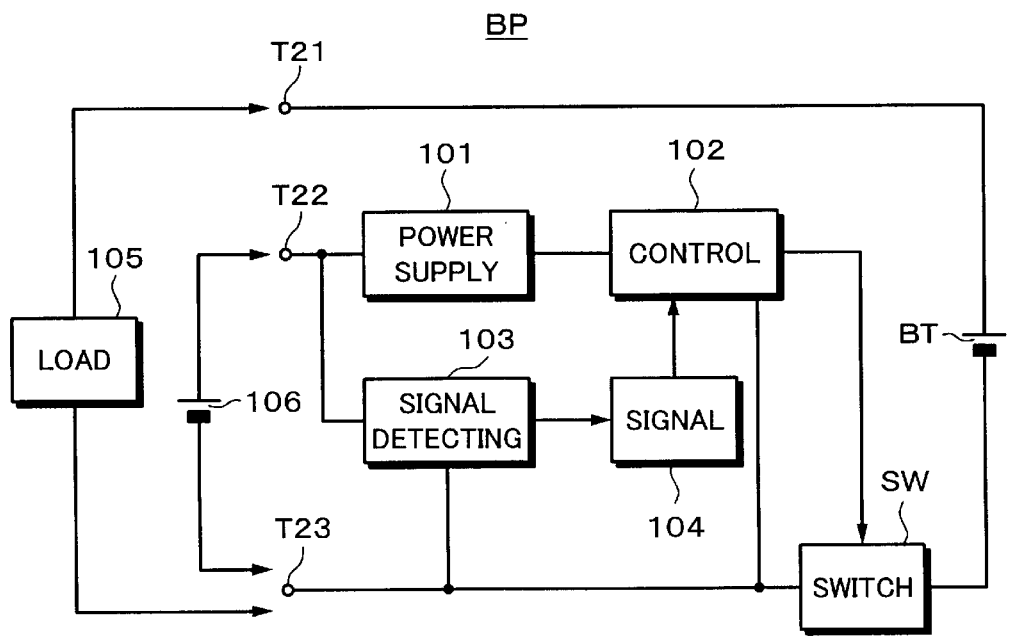
FIG. 16 is a block diagram of the fifth embodiment of a battery pack to which the invention can be applied.

Another embodiment of the invention will now be described hereinbelow with reference to the drawings. The component elements having substantially the same effects in the drawings are designated by the same reference numerals and their overlapped explanation is avoided. FIG. 16 shows the fifth embodiment to which the invention is applied. In FIG. 16, the battery pack BP comprises: a power supply circuit 101; a control circuit 102; a signal detecting circuit 103; a signal circuit 104; terminals T21, T22, and T23; the secondary battery BT; and the switching circuit SW.

A load 105 of an electronic apparatus is connected to the terminals T21 and T23. A power source unit 106 which is derived from a charging device is connected to the terminals T22 and T23. The secondary battery BT and switching circuit SW are serially connected between the terminals T21 and T23.

In the power supply circuit 101, the power source which is supplied from the power source unit 106 through the terminal T22 can be supplied as a constant voltage or a constant current to the control circuit 102. The constant voltage or constant current which is formed by the power supply circuit 101 can make the control circuit 102 operative. The signal detecting circuit 103 detects the voltage and current of the power source which is supplied from the power source unit 106 through the terminal T22. The detected voltage and current are supplied from the signal detecting circuit 103 to the signal circuit 104. The signal circuit 104 supplies a signal showing that the signal is formed in accordance with the detected voltage and current to the control circuit 102. The control circuit 102 controls the switching circuit SW in response to the signal from the signal circuit 104.

Since the switching circuit SW is controlled as mentioned above, the voltage and current which are supplied from the power source unit 106 to the battery pack BP change like pulses.

Figure 17:
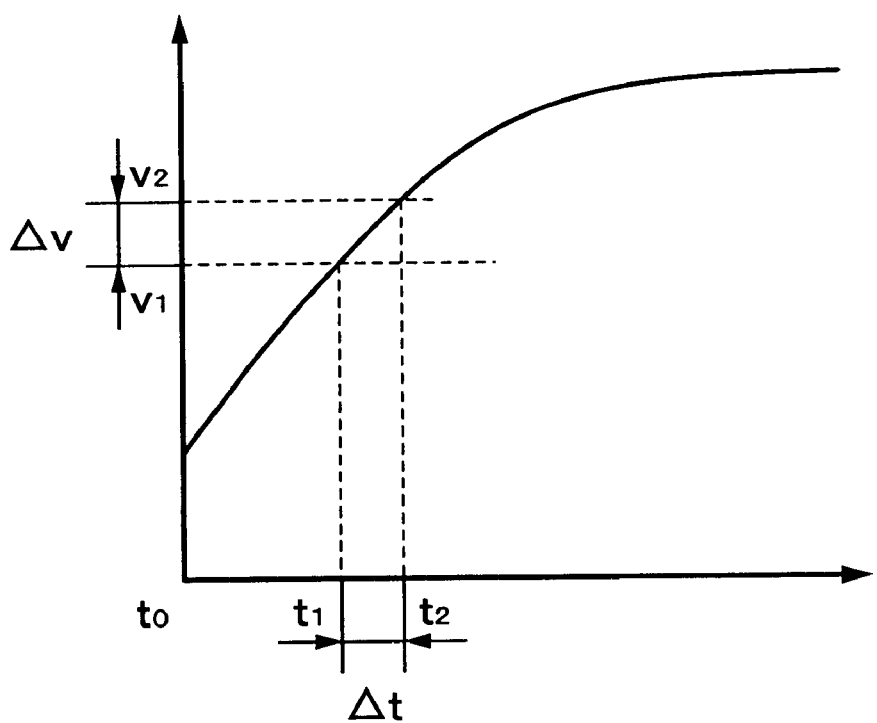
FIG. 17 is a schematic diagram for explaining voltage characteristics according to the invention.

FIG. 17 shows an example of voltage characteristics of the power source unit 106. The charging device is attached to the electronic apparatus at time point t0. For a period of time between time points t0 and t1 during which the voltage is equal to v1 or less, the charging of the secondary battery is stopped. The operation of the electronic apparatus is also stopped. For a period of time between time points t1 and t2 during which the voltage exceeds v1 and is equal to or less than v2, only the charging of the secondary battery is stopped. The power source for making the electronic apparatus operative is supplied to the electronic apparatus. When the voltage exceeds v2 (time point t2), the secondary battery is charged and the power source for making the electronic apparatus operative is supplied to the electronic apparatus.

By using the above construction, if the charging is being performed in a state where the battery pack BP is connected to the electronic apparatus and in a state where the power source of the secondary battery BT of the battery pack BP is reduced, a protecting circuit of the battery pack BP can be made operative by the power source which is obtained from the charging device. At this time, when the electronic apparatus operates, the charging of the secondary battery BT is stopped. The power source which is obtained from the charging device is supplied to the electronic apparatus as a power source for making the electronic apparatus operative.

Figure 18:
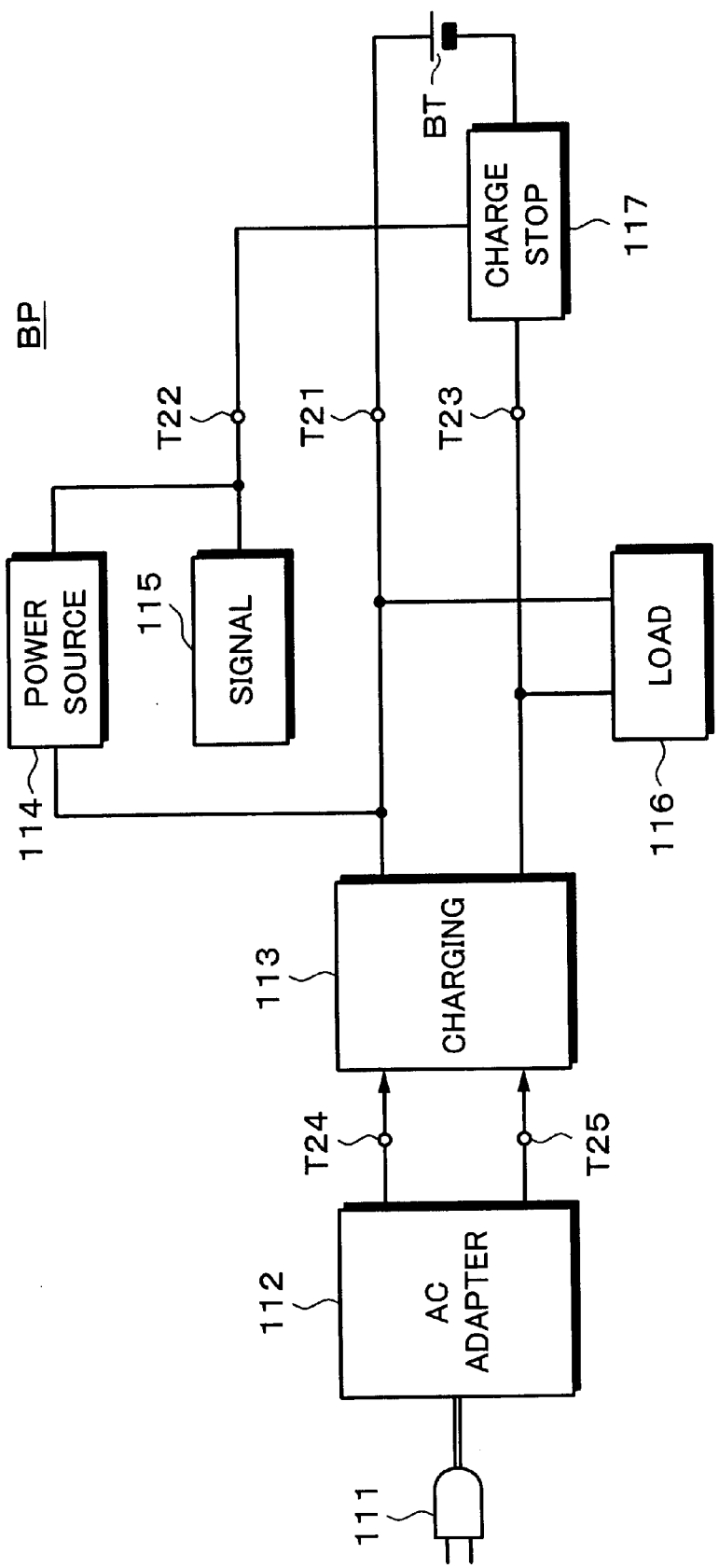
FIG. 18 is a block diagram showing a schematic construction of a charging apparatus to which the invention can be applied.

For example, in the fifth embodiment, as shown in FIG. 18, the electronic apparatus to which the battery pack BP is connected and an AC adapter 112 are connected. A commercially available power source is supplied to the AC adapter 112 through a plug 111. The AC adapter 112 converts the commercially available power source into a predetermined power source. The converted predetermined power source is supplied to the electronic apparatus through terminals T24 and T25.

The electronic apparatus comprises a charging circuit 113, a power source unit 114, a signal circuit 115, and a load circuit 116 of the electronic apparatus. In the charging circuit 113, the power source supplied from the AC adapter 112 is converted into predetermined voltage and current and supplied to the load circuit 116 of the electronic apparatus, the power source unit 114, and battery pack BP. The power source is supplied to the battery pack BP through the terminals T21 and T23.

In the power source unit 114, a power source to be supplied to the battery pack BP is formed from the voltage and current supplied from the charging circuit 113. The power source formed by the power source unit 114 is a power source necessary for controlling the battery pack BP even if the voltage and current of the secondary battery BT of the battery pack BP decrease, and the power source is supplied to the battery pack BP through the terminal T22. The signal circuit 115 forms a signal for controlling a charge stop circuit 117 of the battery pack BP through the terminal T22. In the signal circuit 115, whether the power source for charging the secondary battery BT is supplied or not is discriminated on the basis of a state of the electronic apparatus, and a signal indicative of a result of the discrimination is supplied to the charge stop circuit 117 through the terminal T22.

The battery pack BP comprises the charge stop circuit 117 and the secondary battery BT. The charge stop circuit 117 is controlled by the signal which is supplied from the signal circuit 115 through the terminal T22. The secondary battery BT is charged while the operation of the charge stop circuit 117 is stopped. The charging of the secondary battery BT is stopped while the charge stop circuit 117 is operating.

An example of the electronic apparatus will now be described with reference to FIG. 19. The voltage of the power source which is supplied from the AC adapter 112 through the terminals T24 and T25 is detected by a voltage detecting circuit 121. When the voltage which is equal to or larger than a predetermined value is detected by the voltage detecting circuit 121, a signal is supplied from the voltage detecting circuit 121 to a control circuit 123. A battery voltage detecting circuit 122 detects the voltage of the secondary battery BT which is supplied through the terminals T21 and T23. When the voltage out of a predetermined range is detected by the battery voltage detecting circuit 122, a signal is supplied from the battery voltage detecting circuit 122 to the control circuit 123. That is, when the voltage of the secondary battery BT smaller than the predetermined range is detected or when the voltage of the secondary battery BT exceeding the predetermined range is detected, a signal indicative of such a fact is supplied from the battery voltage detecting circuit 122 to the control circuit 123. The control circuit 123 controls a charge stop signal circuit 124 on the basis of the signal from the voltage detecting circuit 121 and the signal from the battery voltage detecting circuit 122.

In the example, when the voltage which is equal to or larger than a predetermined value is detected by the voltage detecting circuit 121, the signal is supplied to the control circuit 123. However, the signal can be also supplied to the control circuit 123 when the voltage less than the predetermined value is detected by the voltage detecting circuit 121.

Figure 19:
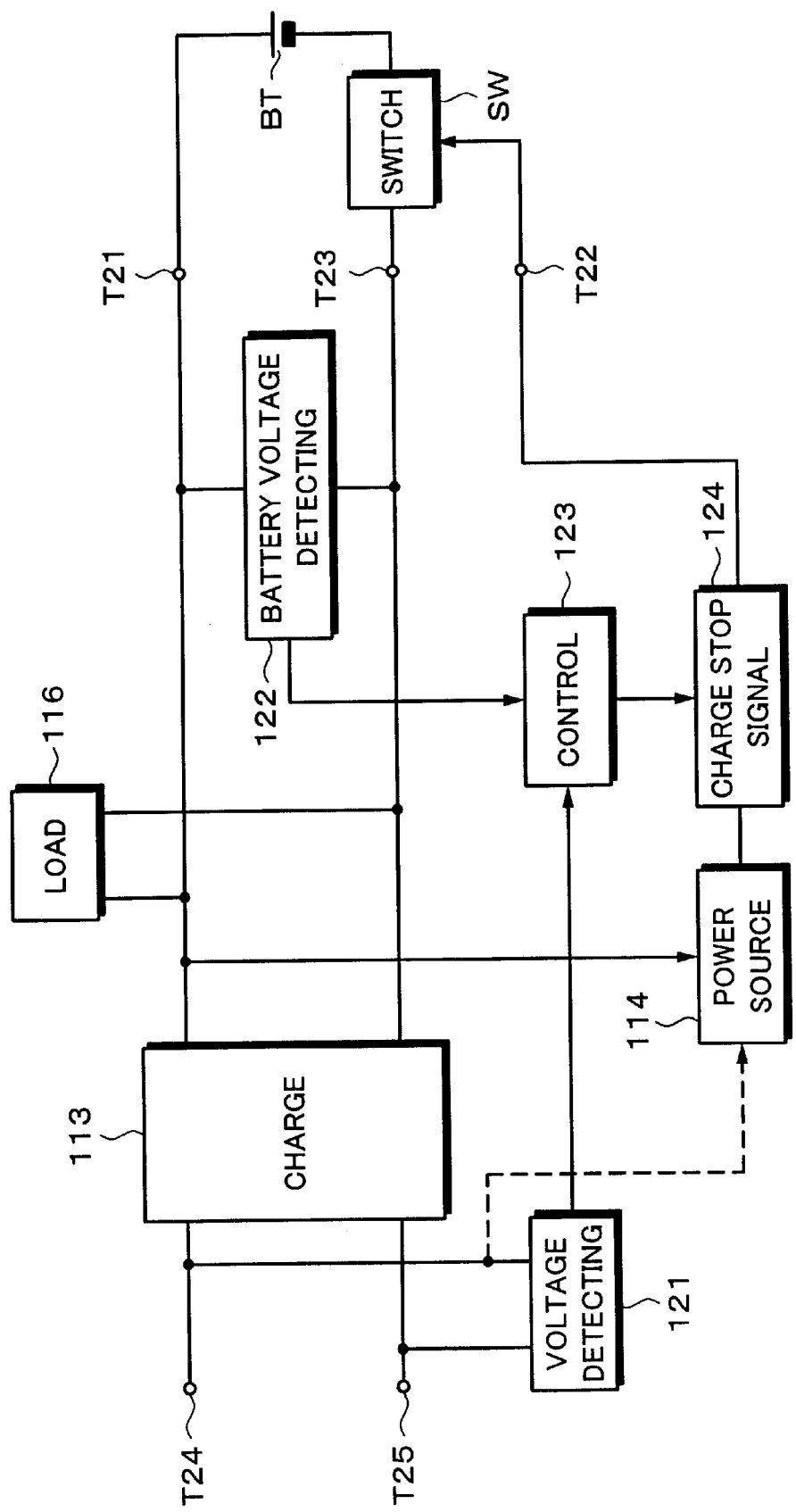
FIG. 19 is a block diagram of an example of an electronic apparatus to which the invention can be applied.

Although the power source unit 114 obtains the power source from the charging circuit 113, the power source can be also obtained from the terminal T24 as shown by a broken line in FIG. 19.

Further, when the voltage of the secondary battery BT smaller than the predetermined range is detected by the battery voltage detecting circuit 122, or when the voltage of the secondary battery BT exceeding the predetermined range is detected, the signal indicative of such a fact is supplied from the battery voltage detecting circuit 122 to the control circuit 123. However, the signal indicative of such a fact can be also supplied from the battery voltage detecting circuit 122 to the control circuit 123 when the voltage of the secondary battery BT within the predetermined range is detected.

Figures 20, 20A, 20B:
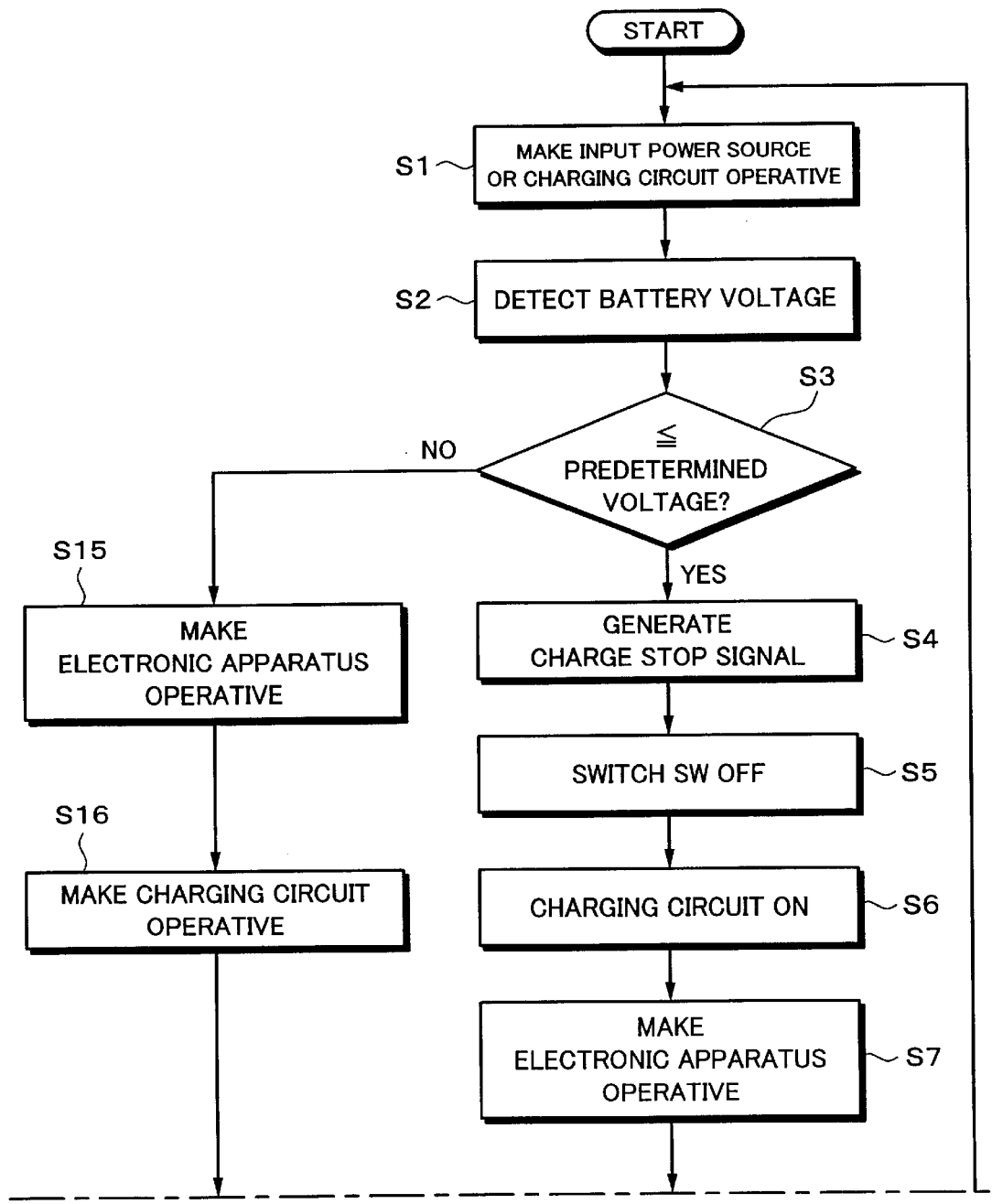
FIG. 20 is a flowchart for explaining the operation in the fifth embodiment of the invention.
Figure 20B:
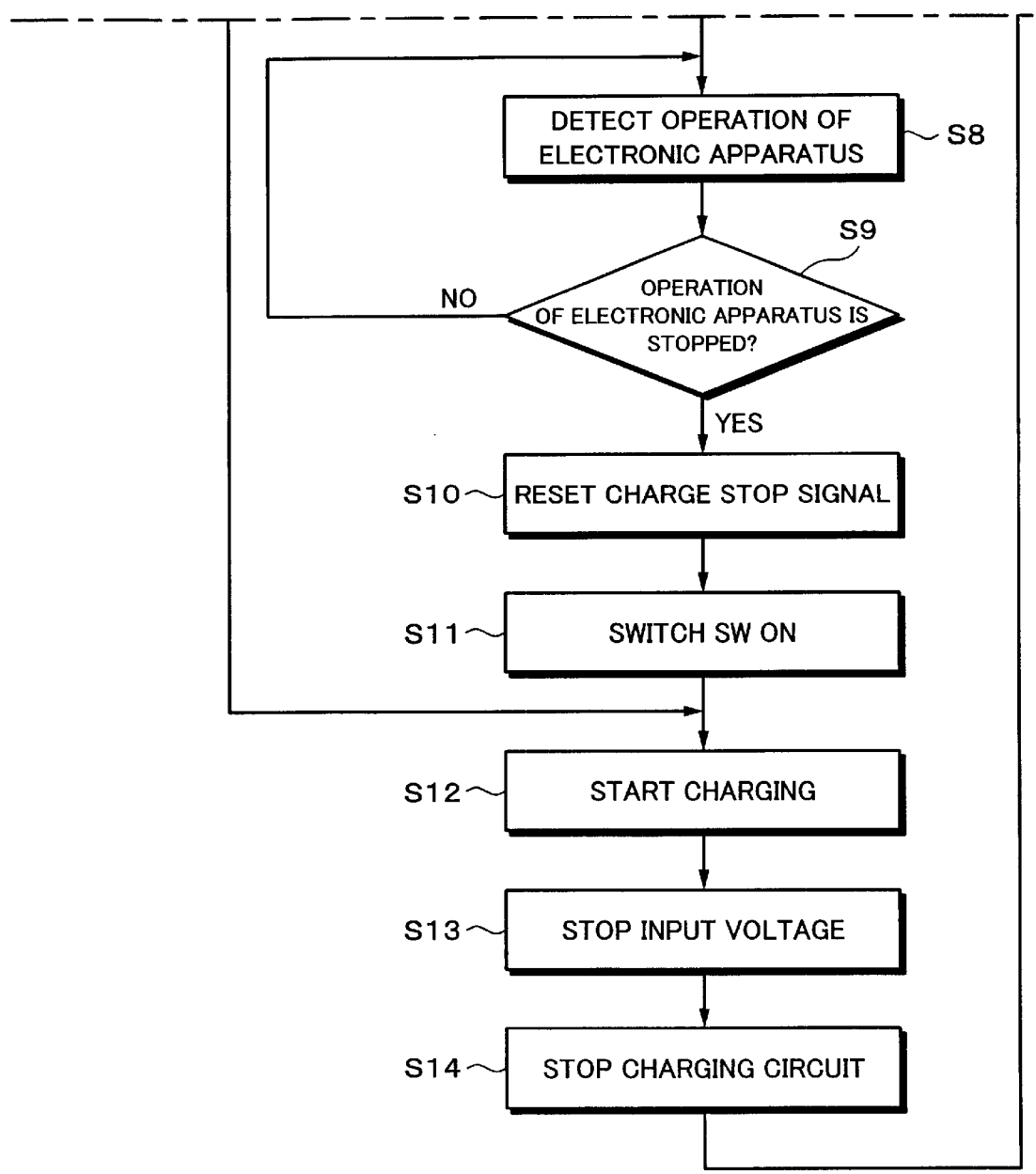

The operation in the fifth embodiment will be described with reference to a flowchart shown in FIG. 20. In step S1, the input power source is supplied or the charging circuit 113 operates. In step S2, the terminal voltage of the secondary battery BT is detected. In step S3, whether the detected terminal voltage is equal to or lower than a predetermined voltage or not is discriminated. If it is determined that the terminal voltage is equal to or lower than the predetermined voltage, the control advances to step S4. If it is determined that the terminal voltage exceeds the predetermined voltage, the control advances to step S15.

In step S4, a charge stop signal is generated. In step S5, the switching circuit SW is turned off. In step S6, the charging circuit 113 operates. In step S7, the electronic apparatus operates. In step S8, the operation of the electronic apparatus is detected. In step S9, whether the operation of the electronic apparatus has been stopped or not is discriminated. If it is decided that the operation of the electronic apparatus has been stopped, the control advances to step S10. If it is decided that the electronic apparatus is operating, the control is returned to step S8.

In step S10, the generated charge stop signal is reset. In step S11, the switching circuit SW is turned on. In step S12, the charging into the secondary battery BT is started. In step S13, the input voltage is stopped. In step S14, the operation of the charging circuit 113 is stopped.

If it is decided in step S3 that the terminal voltage exceeds the predetermined voltage and the control advances to step S15, the electronic apparatus is made operative in step S15. In step S16, the charging circuit 113 is made operative and the control advances to step S12.

Figure 21:
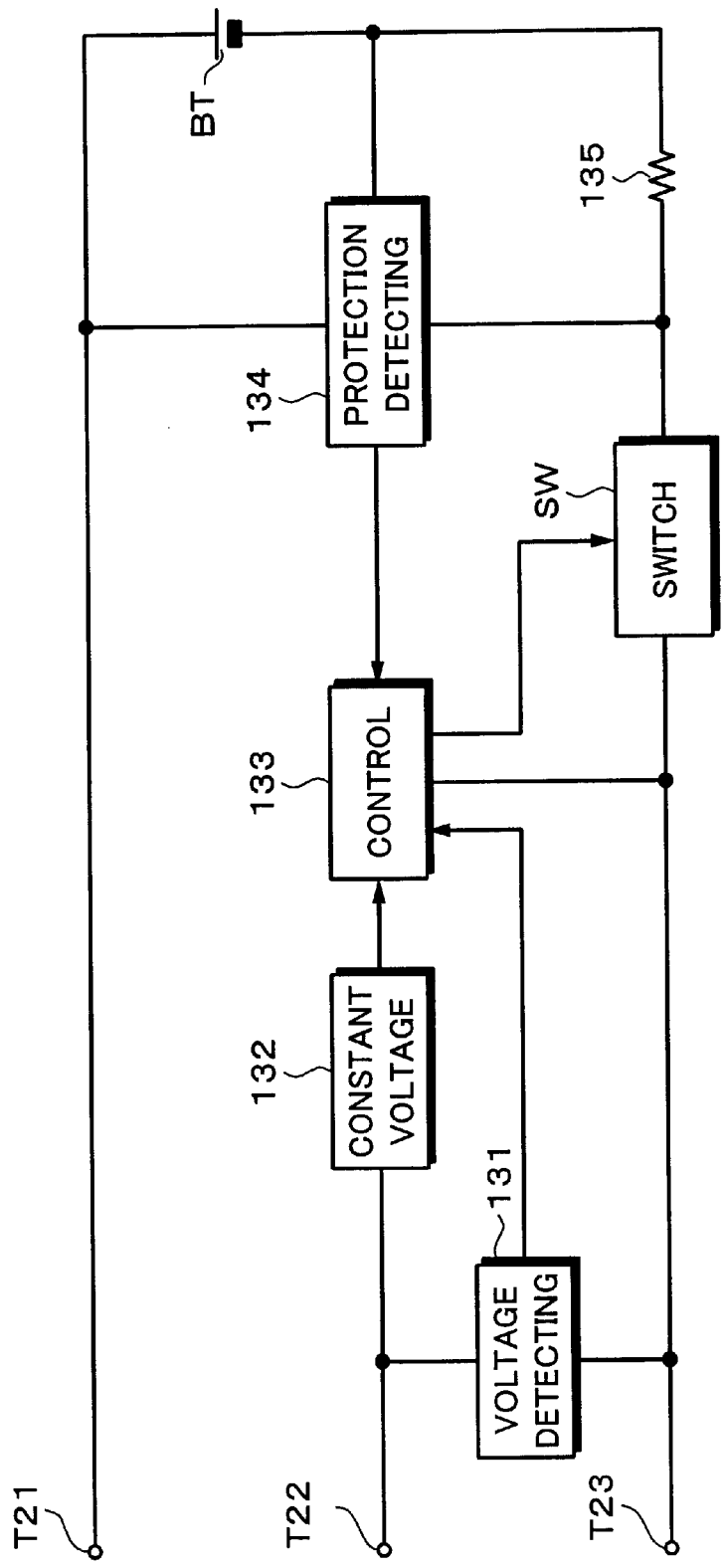
FIG. 21 is a block diagram of the sixth embodiment of a battery pack to which the invention can be applied.
Figure 22:
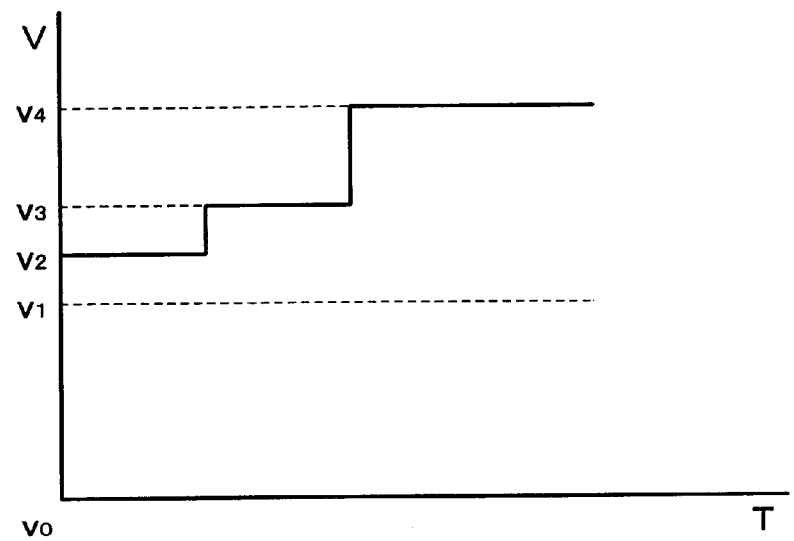
FIG. 22 is a schematic diagram for explaining voltage characteristics according to the invention.

The sixth embodiment of the invention will now be described with reference to FIG. 21. In a voltage detecting circuit 131 provided between the terminals T22 and T23, the voltage which is obtained from the power source unit is detected. For example, as shown in FIG. 22, values of voltages v1, v2, v3, and v4 are detected. The voltage v1 has a voltage value which is at least necessary for making a control circuit 133 operative. The voltage v2 has a voltage value which is at least necessary for supplying a power source to the electronic apparatus. The voltages v3 and v4 have voltage values which are used as signals which are transmitted from the battery pack BP to the outside. As mentioned above, the voltage detected by the voltage detecting circuit 131 is supplied to the control circuit 133.

In a constant voltage circuit 132, a constant voltage which is supplied to the control circuit 133 is formed from the voltage that is supplied from the terminal T22. A protection detecting circuit 134 is used for protecting the secondary battery BT. For example, the terminal voltage and current of the secondary battery BT are detected by the protection detecting circuit 134. The detected terminal voltage and current are supplied to the control circuit 133. The control circuit 133 is made operative by the voltage supplied from the constant voltage circuit 132. The control circuit 133 controls the on/off operations of the switching circuit SW on the basis of the voltages, terminal voltages, and currents which are supplied from the voltage detecting circuit 131 and protection detecting circuit 134. In the sixth embodiment, in case of the voltages v1, v2, and v3 shown in FIG. 22, the electronic apparatus is made operative while charging the battery, and the charging is stopped when the voltage is equal to or higher than v4.

Figure 23:
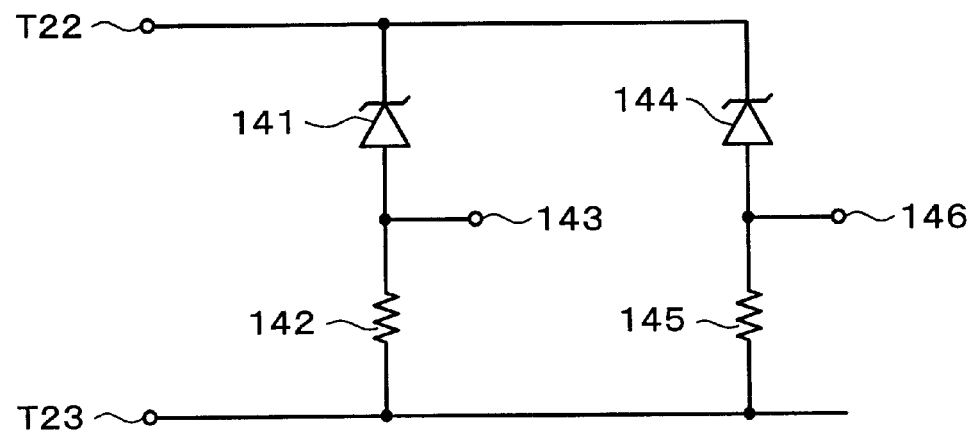
FIG. 23 shows an example of a voltage detecting circuit which can be applied to the invention.

FIG. 23 shows an example of the voltage detecting circuit 131. A cathode of a Zener diode 141 set to the voltage v2 is connected to the terminal T22 and an anode is connected to the terminal T23 through a resistor 142. A terminal 143 is led out from the anode of the Zener diode 141. A cathode of a Zener diode 144 set to the voltage v4 is connected to the terminal T22 and an anode is connected to the terminal T23 through a resistor 145. A terminal 146 is led out from the anode of the Zener diode 144. In the example, when the detected voltage is equal to the voltage v2, a signal is outputted from the terminal 143 and, when the detected voltage is equal to the voltage v4, signals are outputted from the terminals 143 and 146.

Figure 24:
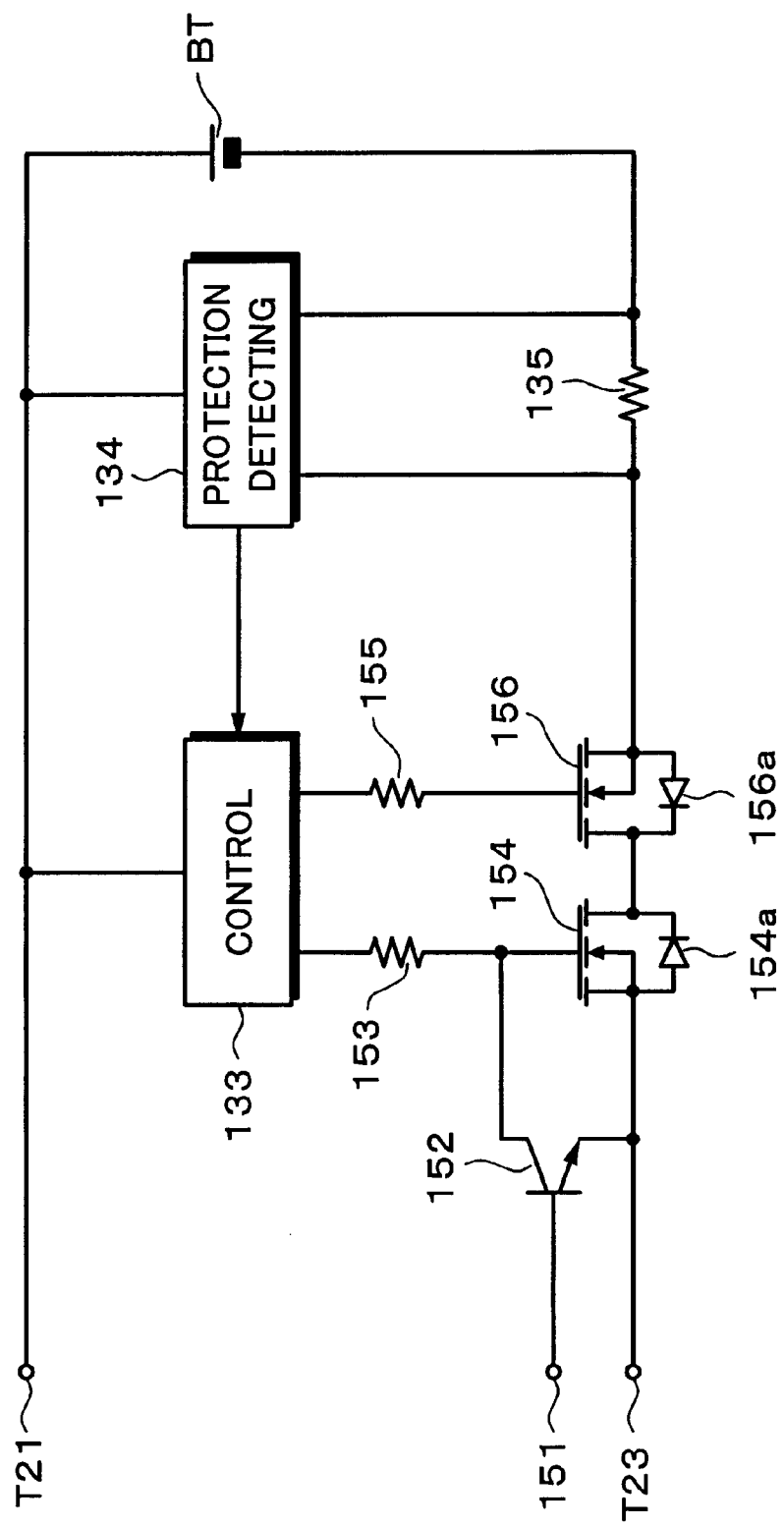
FIG. 24 shows an example of a switching circuit which can be applied to the invention.

FIG. 24 shows an example of the switching circuit SW. In FIG. 24, the switching circuit SW comprises FETs 154 and 156. A base of an npn-type transistor 152 is connected to a terminal 151, an emitter is connected to the terminal T23, and a collector is connected to a gate of the FET 154. A resistor 153 is inserted between the control circuit 133 and the gate of the FET 154. A source of the FET 154 is connected to the terminal T23 and a drain is connected to a drain of the FET 156. A gate of the FET 156 is connected to the control circuit 133 through a resistor 155 and a source is connected to the (−) side of the secondary battery BT through a resistor 135. Parasitic diodes 154a and 156a are provided for the FETs 154 and 156.

Figure 25:
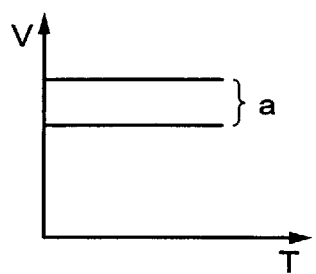
FIG. 25 is a schematic diagram for explaining voltage characteristics according to the invention.

When the voltage in the range (a) shown in FIG. 25 is supplied to the base of the transistor 152 through the terminal 151, the switching circuit SW is turned off. When the voltage which is equal to or less than or exceeds the range (a) is supplied to the base of the transistor 152 through the terminal 151, the switching circuit SW is turned on. The FET 154 is turned on upon charging. The FET 156 is turned on upon discharging.

Figure 26:
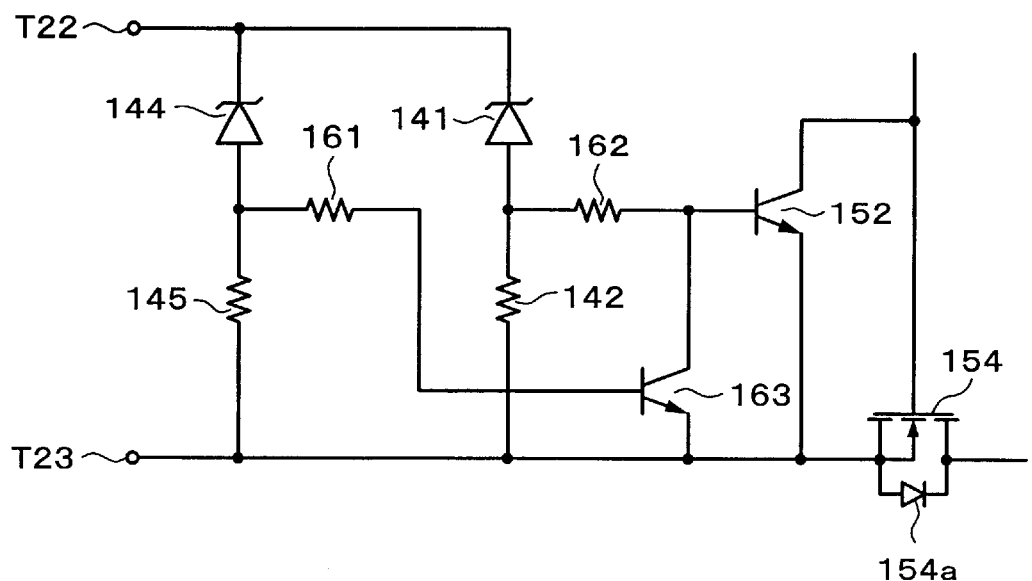
FIG. 26 shows an example of a voltage detecting circuit and a switching circuit which can be applied to the invention.

FIG. 26 shows an example of a circuit comprising the voltage detecting circuit shown in FIG. 23 and the switching circuit SW shown in FIG. 24. A resistor 162 is inserted between the anode of the Zener diode 141 and the base of the transistor 152. A resistor 161 is inserted between the anode of the Zener diode 144 and a base of an npn-type transistor 163. An emitter of the transistor 163 is connected to the terminal T23 and a collector is connected to the base of the transistor 152.

When the voltage exceeds the Zener voltage of the Zener diode 141, the transistor 152 is turned on and the FET 154 is turned off. When the voltage exceeds the Zener voltages of the Zener diodes 141 and 144, the transistor 163 is turned on and the transistor 152 is turned off. Since the transistor 152 is turned off, the FET 154 is turned on.

Figure 27:
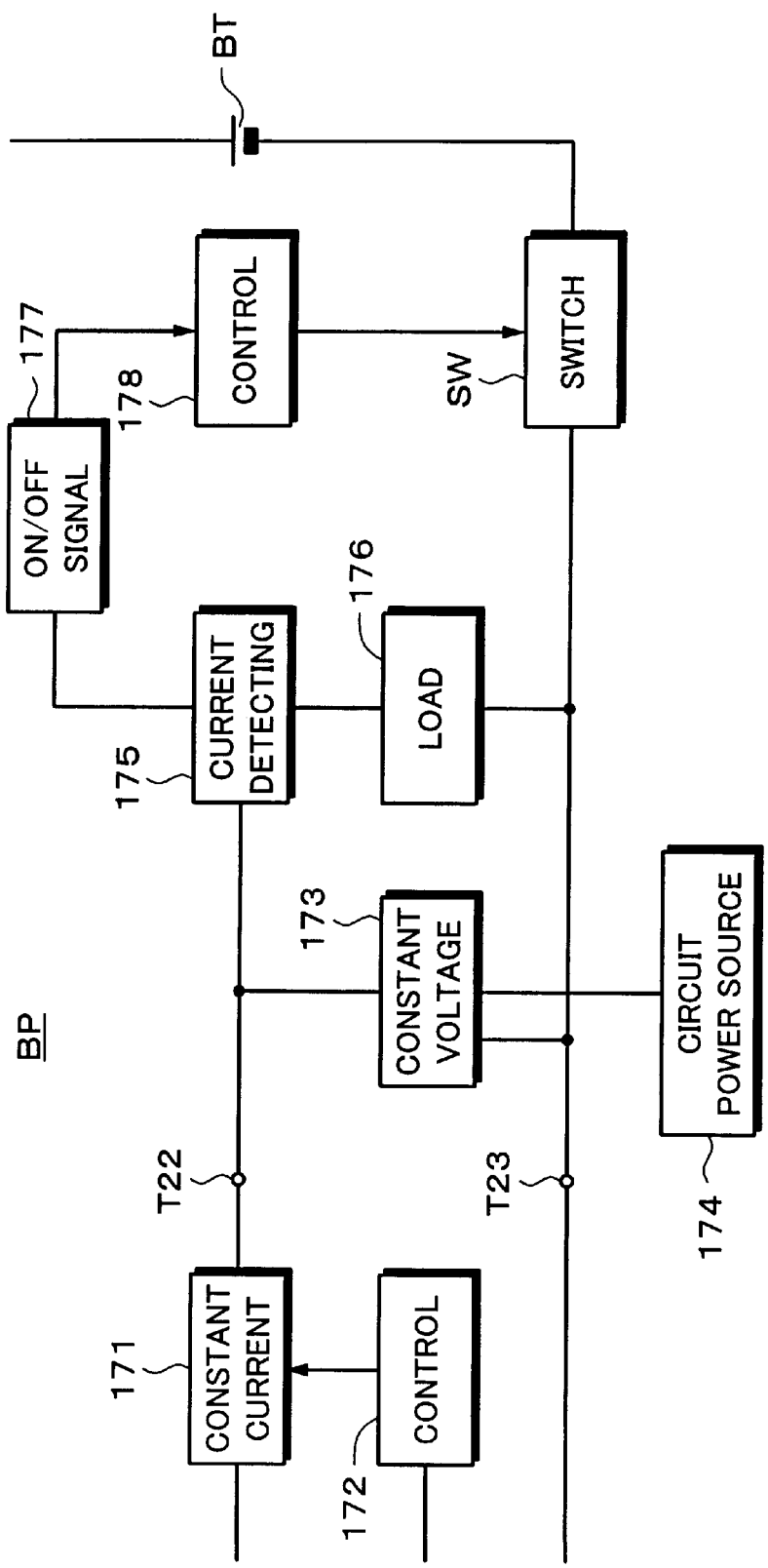
FIG. 27 is a block diagram of an example of a battery pack to which the invention can be applied.

An example of controlling by the current will now be described with reference to FIG. 27. In FIG. 27, a constant current circuit 171 and a control circuit 172 are shown as a part of the AC adapter which is connected to the battery pack BP. The battery pack BP comprises: a constant voltage circuit 173; a circuit power source unit 174; a current detecting circuit 175; a load unit 176; an ON/OFF signal generating circuit 177; a control circuit 178; the switching circuit SW; and the secondary battery BT.

The constant current circuit 171 is controlled by the control circuit 172 and forms a constant current from the power source which is obtained from the charging device. The formed constant current is supplied to the battery pack BP through the terminal T22. In the battery pack BP, a desired constant voltage is formed by the constant voltage circuit 173. The formed constant voltage is supplied to the circuit power source unit 174. The circuit power source unit 174 supplies a power source to each circuit (not shown) in the battery pack BP. The current detecting circuit 175 detects the current which is supplied. The load unit 176 is provided between the current detecting circuit 175 and the terminal T23.

Figure 28:
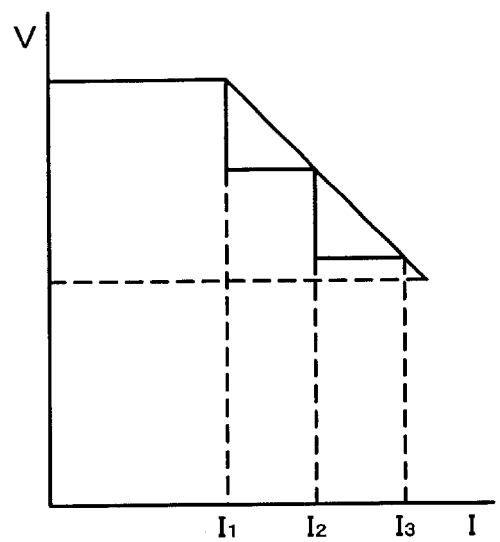
FIG. 28 is a schematic diagram for explaining voltage and current characteristics according to the invention.

The current detecting circuit 175 detects one of currents I1, I2, and I3 as shown in FIG. 28. Therefore, it is possible to control by the current in a manner similar to the case of controlling by the voltage as mentioned above. The current I1, I2, or I3 detected by the current detecting circuit 175 is supplied to the ON/OFF signal generating circuit 177. The ON/OFF signal generating circuit 177 generates an ON signal or an OFF signal to the control circuit 178 in accordance with the supplied current. The control circuit 178 supplies a control signal to the switching circuit SW so as to turn on or off the switching circuit SW in response to the supplied ON signal or OFF signal.

Figure 29:
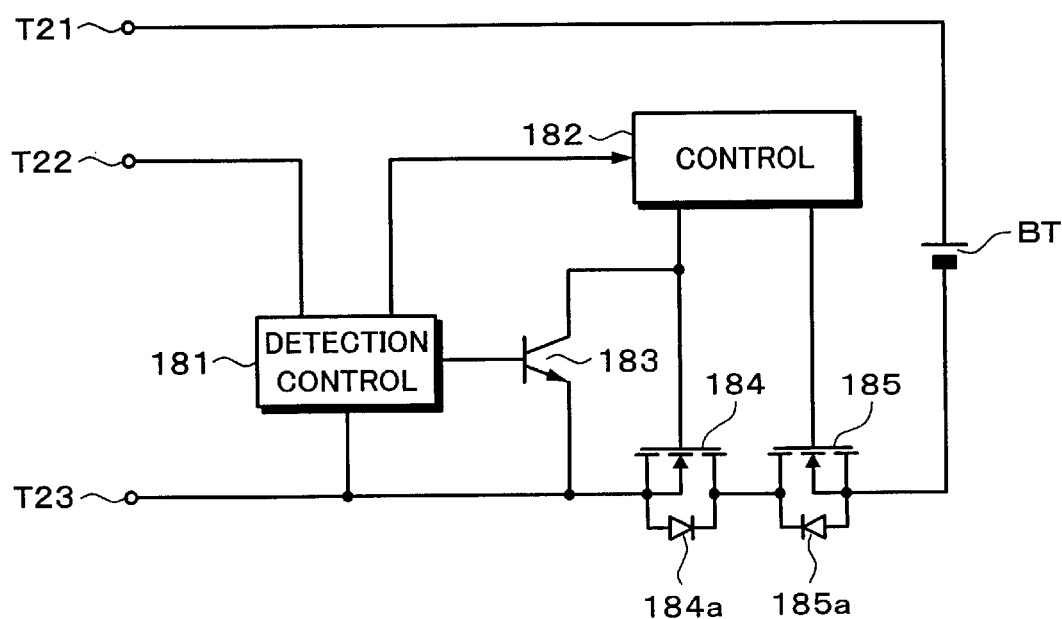
FIG. 29 is a block diagram of the seventh embodiment of a battery pack to which the invention can be applied.

The seventh embodiment of the invention will be described with reference to FIG. 29. According to FIG. 29, when the terminal voltage of the secondary battery BT is lower than the input voltage, the secondary battery BT is charged by a small electric power. Even in case of the terminal voltage which cannot be rapidly charged, the battery is similarly charged. A detection control circuit 181 detects the voltage which is transmitted from the terminal T22. The detected voltage is supplied from the detection control circuit 181 to a control circuit 182. The detection control circuit 181 supplies a control signal to a base of an npn-type transistor 183 on the basis of the detected voltage.

An emitter of the transistor 183 is connected to the terminal T23 and a collector is connected to a gate of an FET 184. Control signals are supplied from the control circuit 182 to gates of FETs 184 and 185 which are controlled by the control circuit 182. A source of the FET 184 is connected to the terminal T23 and a drain is connected to a drain of the FET 185. A source of the FET 185 is connected to the (−) side of the secondary battery BT. Parasitic diodes 184a and 185a are provided for the FETs 184 and 185. The control circuit 182 turns on/off the FETs 184 and 185 in response to the signal supplied from the detection control circuit 181.

In the seventh embodiment, the transistor 183 is turned on in order to set the FET 184 into a high impedance. By changing the impedance of the transistor 183, the impedance is provided without turning off the FET 184.

Figure 30:
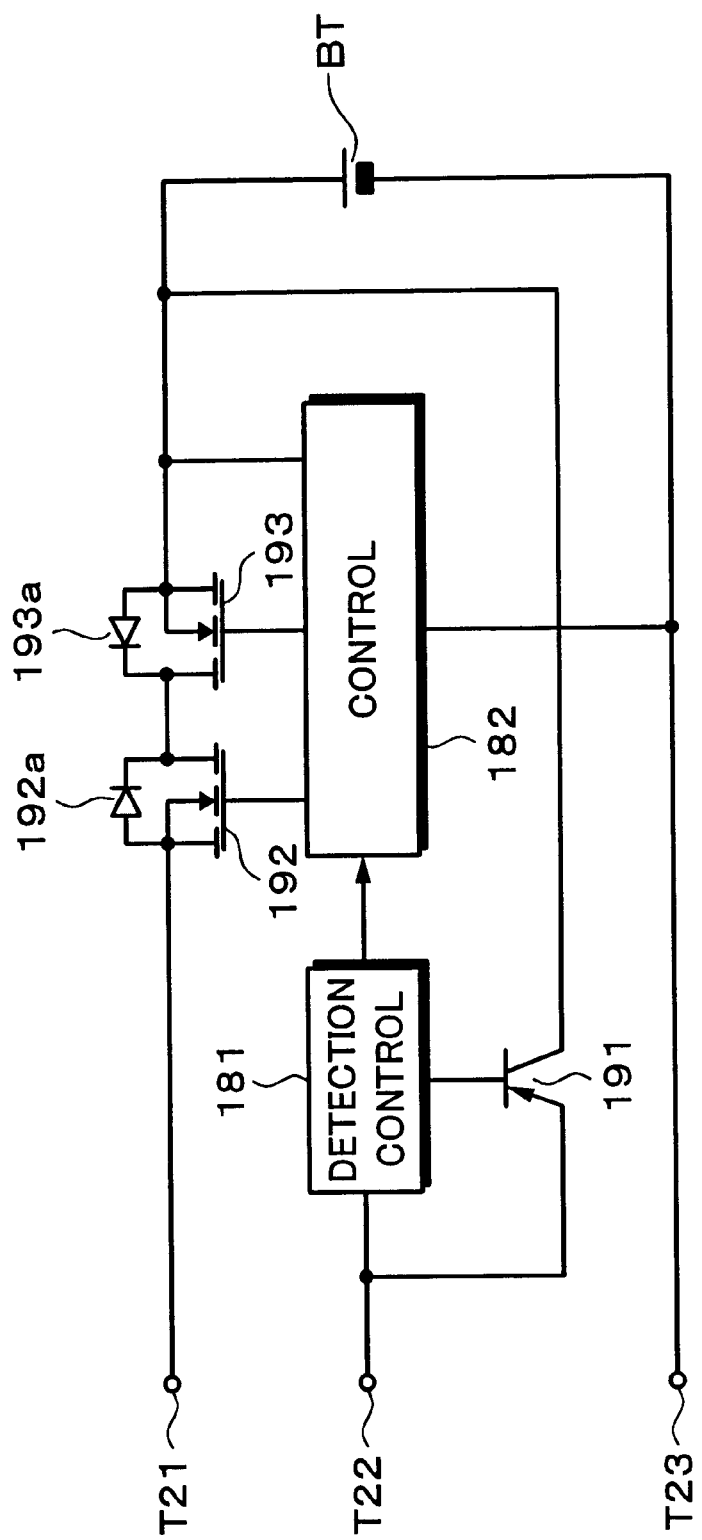
FIG. 30 is a block diagram of another example of a battery pack to which the invention can be applied.

FIG. 30 shows another example of the seventh embodiment. The detection control circuit 181 supplies a control signal to a base of a pnp-type transistor 191 on the basis of the detected voltage. An emitter of the transistor 191 is connected to the terminal T22 and a collector is connected to a plus (+) side of the secondary battery BT. FETs 192 and 193 are provided between the terminal T21 and the secondary battery BT. A source of the FET 192 is connected to the terminal T21 and a drain is connected to a drain of the FET 193. A source of the FET 193 is connected to the (+) side of the secondary battery BT. A gate of the FET 192 and a gate of the FET 193 are connected to the control circuit 182 and a control signal is supplied from the control circuit 182. Parasitic diodes 192a and 193a are provided for the FETs 192 and 193.

With the above construction, for example, when the terminal voltage of the secondary battery BT drops, by turning on the transistor 191, the power source obtained through the terminal T22 is supplied to the secondary battery BT and can be charged.

Figure 31:
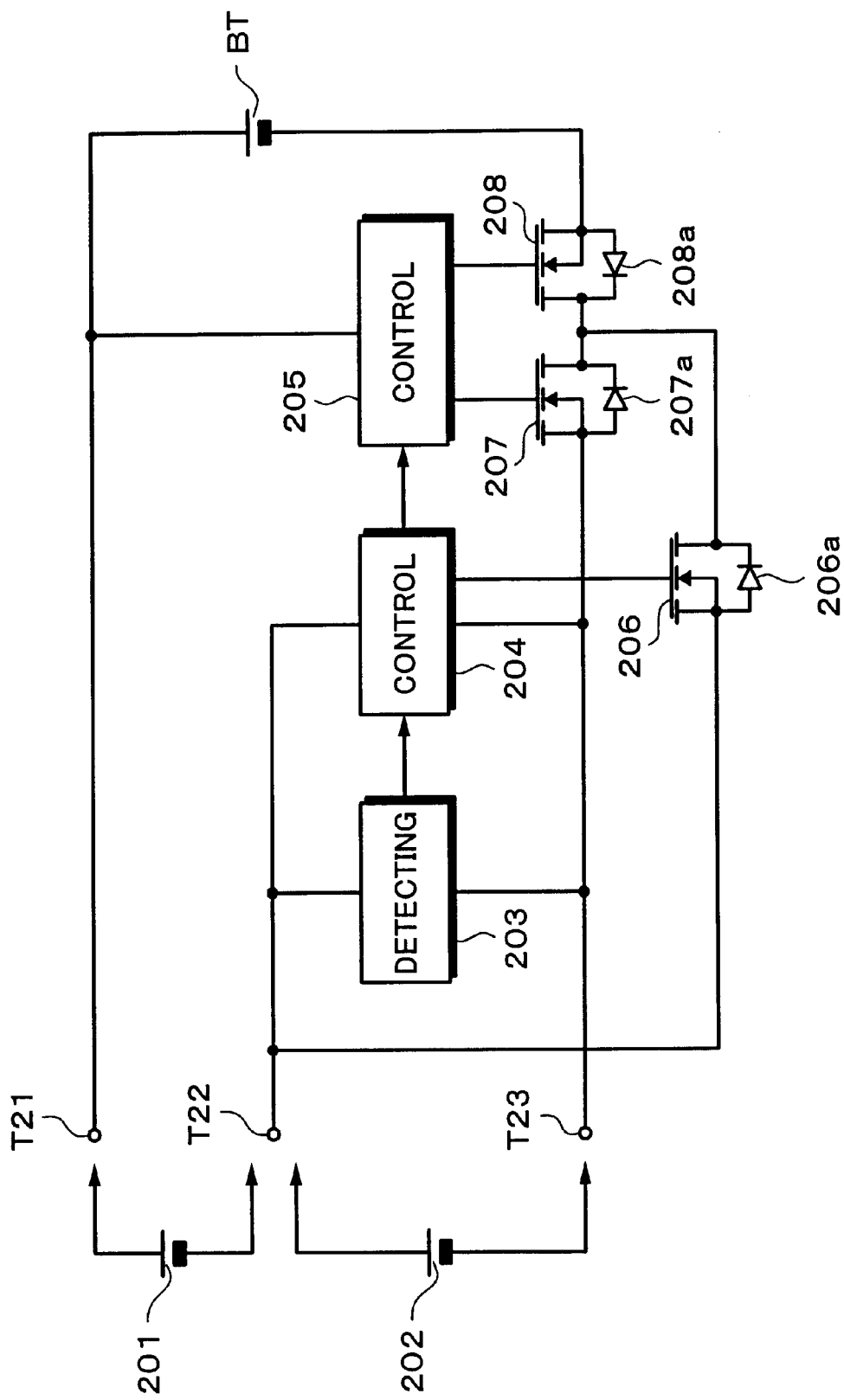
FIG. 31 is a block diagram of still another example of a battery pack to which the invention can be applied.

FIG. 31 shows further another example of the seventh embodiment. As shown in FIG. 31, a power source unit 201 connected to the terminals T21 and T22 is a power source for outputting a charge current for a small electric power. A power source unit 202 connected to the terminals T22 and T23 is a power source which is used for transmitting a signal from the battery pack BP to the outside. A detecting circuit 203 detects a voltage and a current. In a control circuit 204, the supplied voltage and current are used as a power source and a control signal based on the detected voltage and current are supplied to a gate of an FET 206. Further, in a control circuit 205, the on/off operations of FETs 207 and 208 are controlled on the basis of the signal from the control circuit 204. Parasitic diodes 206a, 207a, and 208a are provided for the FETs 206, 207, and 208.

The charging power source of a small electric power and the power source for the signal can be also used as mentioned above.

According to the invention, by using the circuit for prevention of a chain short-circuit, the signal can be transmitted from the battery pack to the charging device upon charging of the secondary battery in which higher safety is demanded.

According to the invention, the signal can be transmitted among the electronic apparatus, charging device, and battery pack by at least three terminals.

According to the invention, the power source for forming the signal which is transmitted from the battery pack is supplied from the outside and the same terminal can be used as a terminal to which the power source is supplied and a terminal to transmit the signal. Therefore, it is sufficient that the battery pack has three terminals. Thus, a size of external shape of the battery pack can be reduced.

According to the invention, by using the power source which is supplied from the outside, the switching circuit SW provided as a protecting circuit can be controlled irrespective of the capacity of the secondary battery BT. Further, the signal can be generated and the generated signal can be transmitted to the outside.

The present invention is not limited to the foregoing embodiments but many modifications and variations are possible within the spirit and scope of the appended claims of the invention.

What is claimed is:

1. A battery pack using a secondary battery, comprising:
   at least first, second, and third terminals;
   signal generating means for transmitting a signal from one of said first, second, and third terminals;
   first detecting means for detecting an impedance of a first device connected to said first and second terminals and for detecting a terminal voltage of a second device connected to said second and third terminals;
   second detecting means for detecting a temperature, a voltage, and/or a current of said secondary battery;
   switching means connected in series with said secondary battery; and
   control means for turning on the switching means when the impedance or terminal voltage is detected by said first detecting means and turning off said switching means when the impedance or the terminal voltage is not detected by said first detecting means.

2. A battery pack according to claim 1, wherein said first device is a load and said second device is a charging device.

3. A battery pack according to claim 1, wherein when the temperature, voltage, and/or current of said secondary battery which is detected by said second detecting means, said signal generating means generates the signal based on the detected value.

4. A battery pack according to claim 3, wherein said signal generating means generates the signal by changing the impedance and changing the current.

5. A battery pack according to claim 3, wherein said signal generating means generates the signal by changing the voltage.

* * * * *